(12) United States Patent
Schumann et al.

(10) Patent No.: US 12,335,549 B2
(45) Date of Patent: Jun. 17, 2025

(54) SYSTEMS, METHODS, AND APPARATUSES FOR IMPROVED CONTENT STORAGE PLAYBACK

(71) Applicant: Comcast Cable Communications, LLC, Philadelphia, PA (US)

(72) Inventors: Spencer Darl Schumann, Denver, CO (US); Michael Yuanhui Liu, Denver, CO (US); Christopher Day, Denver, CO (US)

(73) Assignee: Comcast Cable Communications, LLC, Phhiladelphia, PA (US)

( * ) Notice: Subject to any disclaimer, the term of this patent is extended or adjusted under 35 U.S.C. 154(b) by 110 days.

(21) Appl. No.: 18/128,361

(22) Filed: Mar. 30, 2023

(65) Prior Publication Data
US 2024/0333992 A1 Oct. 3, 2024

(51) Int. Cl.
*H04N 21/258* (2011.01)
*H04N 21/25* (2011.01)
*H04N 21/845* (2011.01)

(52) U.S. Cl.
CPC ..... *H04N 21/25891* (2013.01); *H04N 21/251* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 11,051,053 B2 | 6/2021 | Epstein et al. | |
| 11,949,931 B2 * | 4/2024 | Bress | H04N 21/254 |
| 2009/0257733 A1 * | 10/2009 | Ellis | G11B 27/034 |
| | | | 386/293 |
| 2014/0201802 A1 * | 7/2014 | Boss | H04N 21/4384 |
| | | | 725/134 |
| 2014/0282762 A1 * | 9/2014 | Bjordammen | H04N 21/25825 |
| | | | 725/92 |
| 2015/0088423 A1 * | 3/2015 | Tuukkanen | G01C 21/26 |
| | | | 701/538 |
| 2016/0007093 A1 * | 1/2016 | Liu | H04N 21/251 |
| | | | 725/32 |
| 2016/0148228 A1 * | 5/2016 | Cui | H04N 21/25891 |
| | | | 705/7.31 |
| 2018/0184137 A1 * | 6/2018 | Epstein | H04N 21/2668 |
| 2019/0207996 A1 * | 7/2019 | Sehgal | H04L 65/612 |
| 2020/0221180 A1 * | 7/2020 | Pietsch | H04N 21/44231 |
| 2021/0360323 A1 * | 11/2021 | Sharma | H04N 21/4668 |
| 2022/0385980 A1 * | 12/2022 | Galbraith | H04N 21/4335 |

* cited by examiner

*Primary Examiner* — Alexander Q Huerta
(74) *Attorney, Agent, or Firm* — Ballard Spahr LLP

(57) ABSTRACT

Methods, systems, and apparatuses are provided for predicting consumption of recorded content. A content item may be recorded for subsequent consumption by a user. Predictive data associated with when the recorded content item will be subsequently consumed by the user may be determined. The predictive data may be determined based on the content type for the content item and user behavior history. The predictive data may include a predicted time window for receiving a request from the user to consume the recorded content item and a confidence level. Data indicating the predictive data may be associated with or included with the recorded content item, and at least a portion of the recorded content item may be prepared for delivery or delivered to a user device based on the predicted time the recorded content item will be consumed.

20 Claims, 8 Drawing Sheets

SYSTEMS, METHODS, AND APPARATUSES FOR IMPROVED CONTENT STORAGE PLAYBACK

BACKGROUND

Video-on-demand and digital video recorders (DVR) provide users with the ability to record and then subsequently watch shows, sporting events, and the like at a time that is convenient to the user's schedule. This has resulted in a proliferation of the use of cloud-based DVR services and recordings by users, which increases the challenge of managing, storing, and reconstituting a large volume of stored video content for future access by and transmission to the viewer. This disclosure presents techniques to address this and other shortcomings.

SUMMARY

It is to be understood that both the following general description and the following detailed description are exemplary and explanatory only and are not restrictive. Methods and systems for communications management are described.

Methods, systems, and apparatuses are provided for predicting when recorded content will be consumed by a user. A content item may be recorded for subsequent consumption. For example, a user may select a content item to be recorded for later viewing by the user. Predictive data for subsequently viewing the recorded content item may be determined. The predictive data may include, for example, a predicted time window when the recorded content item will be subsequently consumed (e.g., viewed, listened to, etc.) by the user, the likelihood the user will view the recorded content and the likelihood the prediction of the time window is correct. The content item may be recorded and the predictive data may be stored in or otherwise associated with the recorded content item. At least a portion of the recorded content item may be prepared for delivery or delivered for consumption based on the predictive data. For example, the content item may be reconstituted from an archived content item and made ready for viewing by the user.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the apparatuses and systems described herein.

DETAILED DESCRIPTION

Figure 1:
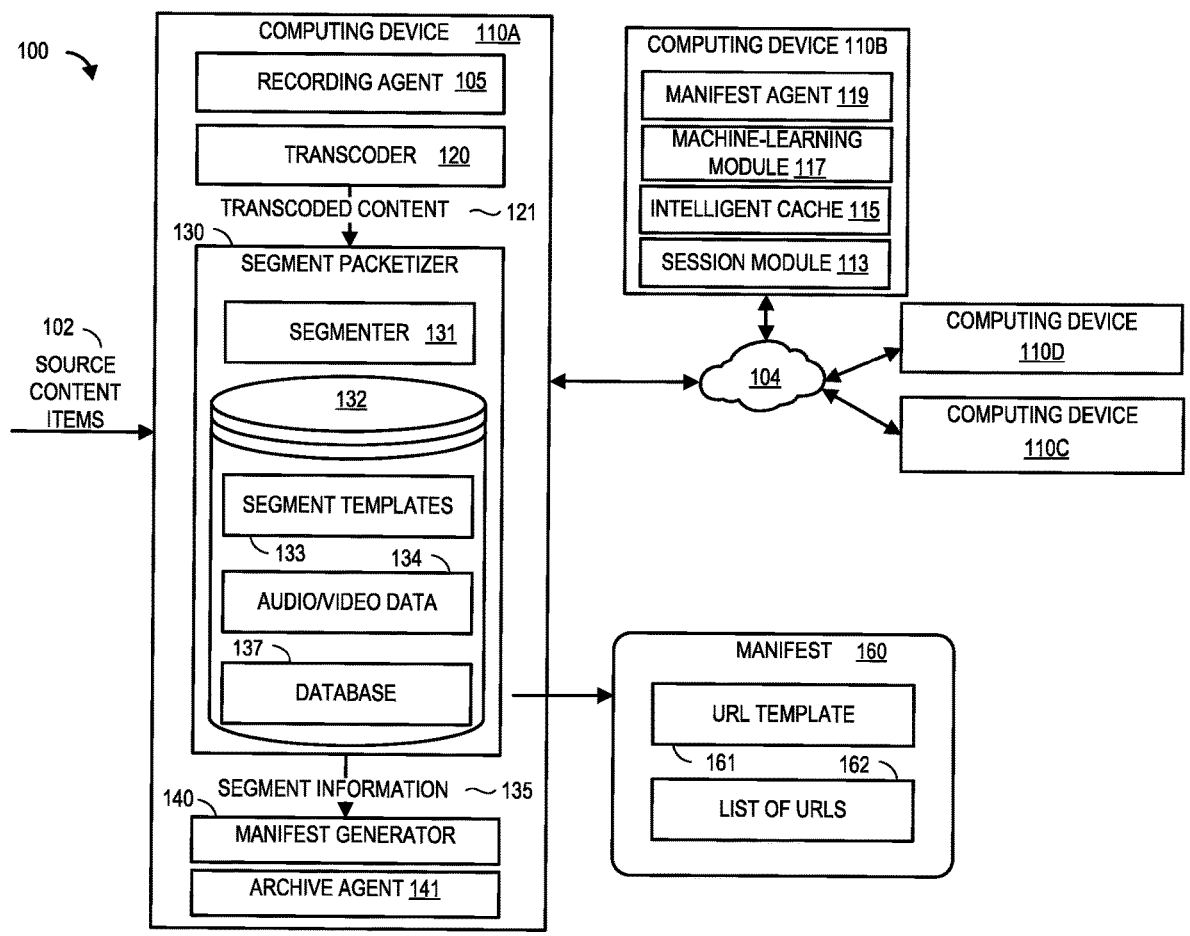
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Methods, systems, and apparatuses for improved playback of recorded content items are described herein. Content streaming services, such as cloud-based digital video recording (DVR) services, may rely on manifest files/messages (collectively referred to herein as "manifests" or "content manifests") when providing content to user devices. Such manifests may comprise a description of audio and/or video files for a particular content item or portion thereof. For a content item that is streamed/output "on-demand," the corresponding manifest may be static in terms of size, because the manifest typically identifies all corresponding portions of the content item. For recorded content items, such as cloud-based DVR recordings, the corresponding manifests, in terms of size and composition, may have aspects of a manifest for an on-demand content item. The manifests for recorded content items need to be provided to the user devices before the user devices may begin receiving the recorded content item. Maintaining a manifest for each recorded content item, while awaiting a request to review every one of the recorded content items may require an extensive use of computational resources. On the other hand, waiting to determine and generate the manifest until a particular recorded content item is requested to be viewed can cause a delay in being able to provide the recorded content item to the user device due to the time needed to determine and generate the manifest.

FIG. 1 shows an example system 100 for improved playback or recorded content. The system 100 may comprise a content delivery network, a data network, a content distribution network, or any other network or content distribution system that one skilled in the art would appreciate. The system 100 may comprise computing devices 110A-110D. FIG. 1 shows the computing device 110A as comprising a plurality of modules and components, the computing device 110B as comprising a few modules and components, for explanatory purposes only. It is to be understood that all of the computing devices 110A-110D shown in the system 100 may comprise additional components/modules, other than those that are shown in FIG. 1. For example, as shown in FIG. 1, the computing device 110A may comprise a recording agent 105. In other example configurations of the system 100, the recording agent 105 may be a component/module of another computing device—or an entirely separate entity (not shown). As another example, as shown in FIG. 1, the computing device 110B may comprise an intelligent cache 115 and/or a machine-learning module 117. In other example configurations of the system 100, either one or both of the intelligent cache 115 and the machine-learning module 117 may be a component/ module of another computing device—or an entirely separate entity (not shown). Other example configurations are possible.

The computing devices 110A-110D may communicate via a network 104. The network 104 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent on the network 104 via a variety of transmission paths, including wireless paths (e.g., satellite paths, Wi-Fi paths, cellular paths, etc.) and terrestrial paths (e.g., wired paths, a direct feed source via a direct line, etc.).

The computing device 110A may comprise an origin. An origin computing device may comprise a server (e.g., a content server) and/or a device (e.g., an encoder, decoder, transcoder, packager, etc.). An origin computing device may generate and/or output portions of content for consumption (e.g., output). For example, an origin computing device may convert raw versions of content (e.g., broadcast content) into compressed or otherwise more "consumable" versions suitable for playback/output by user devices, media devices, and other consumer-level computing devices. "Consumable" versions of content—or portions thereof—generated and/or output by an origin computing device may include, for example, data files adhering to H.264/MPEG-AVC, H.265/MPEG-HEVC, H.266/MPEG-VVC, MPEG-5 EVC, MPEG-5 LCEVC, AVI, MPEG2, MPEG, MPEG4 UHD, SDR, HDR, 4k, Adobe® Flash® Video (.FLV), ITU-T H.261, ITU-T H.262 (MPEG-2 video), ITU-T H.263, ITU-T H.264 (MPEG-4 AVC), ITU-T H.265 (MPEG HEVC), ITU-T H.266 (MPEG VVC) or any other video file format, whether such format is presently known or developed in the future. For ease of explanation, the description herein may use the phrase "origin computing device" in the singular form. However, it is to be understood that an origin computing device may comprise a plurality of servers and/or a plurality of devices that operate as a system to generate and/or output portions of content, convert raw versions of content (e.g., broadcast content) into compressed or otherwise more "consumable" versions, etc.

The computing device 110A may comprise a recording agent 105, a transcoder 120, a segment packetizer 130, and/or a manifest generator 140, each of which may correspond to hardware, software (e.g., instructions executable by one or more processors of the computing device 110A), or a combination thereof. The transcoder 120 may perform bitrate conversion, coder/decoder (CODEC) conversion, frame size conversion, etc. For example, the computing device 110A may receive source content 102 (e.g., one or more content items, such as movies, television shows, sporting events, news shows, etc.) and the transcoder 120 may transcode the source content 102 to generate one or more transcoded content 121. The source content 102 may be a live stream of content (e.g., a linear content stream) or video-on-demand (VOD) content. The computing device 110A may receive the source content 102 from an external source (e.g., a stream capture source, a data storage device, a media server, etc.). The computing device 110A may receive the source content 102 via a wired or wireless network connection, such as the network 104 or another network (not shown). It should be noted that although a single source of content 102 is shown in FIG. 1, this is not to be considered limiting. The computing device 110A may receive any number of source content 102.

As discussed herein, the computing device 110A may receive source content 102 and the transcoder 120 may transcode the source content 102 to generate one or more transcoded content 121 (e.g., one or more transcoded content items). The recording agent 105 may instruct the transcoder 120 to generate the one or more transcoded content 121 for one or more recording sessions/content recordings. The recording agent 105 may cause the transcoded content 121, as well as associated metadata that identifies each portion of the corresponding content items, to be stored by the segment packetizer 130. For example, the segment packetizer 130 may comprise a storage medium 132, as shown in FIG. 1. The storage medium 132 may be in communication with at least one other storage medium (not shown). While FIG. 1 shows the storage medium 132 as being a part of the computing device 110A, it is to be understood that the storage medium 132 may be a separate entity or entities. The storage medium 132 may store the transcoded content 121 of the content items (e.g., recorded content items). As discussed further herein, the segmenter 131 may generate segment templates 133 for each segment (e.g., portion) of each of the transcoded content 121. Each of the segment templates 133 may include metadata indicative of the underlying audio/video data 134 for the corresponding segment. The metadata that identifies each portion of the corresponding content items may comprise—or be based on—the segment templates 133 and/or the underlying audio/video data 134 for each corresponding segment/portion of a content item. The storage medium 132 may comprise a database 137. While FIG. 1 shows the storage medium 132 as having one database 137, it is to be understood that the storage medium 132 may comprise a plurality of databases, and FIG. 1 shows only one database (i.e., the database 137) for ease of explanation. The database 137 may store portions of content items, such as segments, fragments, video/audio files, a combination thereof, and/or the like. For example, the recording agent 105 may cause each portion of the corresponding content items and/or the metadata that identifies each portion of the corresponding content items to be stored in the database 137. Predictive data associated with the content item may be stored in these portions of the content item. For example, the predictive data may be determined and stored within a header, metadata, or another portion of these portions of the content item. For example, the predictive data may include one or more of a predicted time window for receiving a request from the user to watch the recorded content item, a confidence level that the user will request to watch the recorded content item, or a confidence level that the predicted time window is correct.

The database 137 may be configured to store one copy of a recorded content item for each request to record the content item. As such, each recorded content item may be associated with a particular user or computing device 110D from which the request to record the content item was received. For example, the system 100 may be configured to maintain the unique storage of the recorded content item in the database 137 for each user or computing device 110D associated with the request for the recording of the content item, for a threshold time period, such as seven days. For example, for the threshold time period after the recorded content item is stored in the database 137, that particular copy of the recorded content item is stored uniquely for that particular user or computing device 110D that requested the recording of that content item in the database 137. Once the threshold time period is satisfied (e.g., after the seven days have passed since the recorded content item was recorded), however, the unique copy associated with that user or computing device 110D may be deleted from the database 137, and a copy of the content item may be archived (if not previously archived based on a prior request to record the content item). Those of ordinary skill in the art will recognize that the use of seven days for the threshold time period before archiving is for example purposes only, as the time period may be greater than or less than seven days and any amount of time between and including 6 hours to 90 days. An archived copy of the content item may be prepared and maintained by an archive agent 141. Should a request to watch the recorded content item be received from the user or computing device 110D associated with the request to record the content item after the threshold time period for archiving is satisfied, then the archive copy of the recorded content item may be retrieved by the archive agent 141. The archive agent 141 may prepare a reconstituted copy of the recorded content item, the segments of which may then be subsequently sent to the computing device 110D associated with the user making the request to watch the recorded content item.

The system 100 may comprise a computing device 110B. The computing device 110B may be in communication with each device shown in the system 100. The computing device 110B may comprise a session module 113. The session module 113 may track computing devices (e.g., a plurality of computing devices 110D) that are requesting that content items be recorded, using a session index, as further discussed herein. The session index may identify which computing devices are requesting that content items be recorded (e.g., computing devices that have requested the content item be recorded but are not simultaneously outputting the corresponding content items while a portion of the content item is being recorded (e.g., cold-recording the content items) and/or computing devices that have requested the content item be recorded and are simultaneously outputting the corresponding content item while a portion of the content item is still being recorded (e.g., hot-recording the content items). The session index may include additional data associated with the content item being recorded and or the request to record the content item. For example, the session index may include the scheduled airing time for the content item, the duration (i.e., run-time length) of the content item, the content type or genre for the content item (e.g., a movie, a sporting event, a concert, a news program, a sit-com program, a drama program, a children's program, a cartoon program, etc.), a content rating for the content item, a number of times the content item has previously aired, user data for a user associated with the computing device 110D (e.g., gender, age, address or location, prior content items recorded, amount of time to watch each of the prior content items recorded), device information for the particular computing device 110D (e.g., device ID, URL, MAC address, etc.), a predicted time window for the content item being recorded, etc.

The computing device 110B may comprise an intelligent cache 115. The intelligent cache 115 may comprise one or more caching devices (e.g., storage mediums). The intelligent cache 115 may store manifests (e.g., manifest files) associated with each of the content items (or portions thereof) (e.g., each of the recorded content items for which manifest files have been determined and/or generated), as further discussed herein.

The computing device 110B may comprise a machine-learning module 117. The machine-learning module 117 may be configured to evaluate historical playback data associated with recorded content items (e.g., from the session index of the session module 113) and the time it took for those recorded content items to be viewed (such as on a user device (e.g., computing device 110D) associated with a user that requested that the content item be recorded)(e.g., from the session index of the session module 113) and may develop a trained model that predicts, based on an indication of a recording of a content item, a predicted time window (e.g., a range of time, such as between a predicted earliest viewing time and a predicted latest viewing time, with reference to a time that the content item was recorded) associated with when the particular recording of the content item will be viewed at the computing device 110D or another computing device (e.g., a user device, such as a television, smart phone, tablet computer, laptop computer, desktop computer, set-top-box, etc.) associated with the user making the request to record the content item. For example, the historical playback data may be based on the particular user that sent the request to record the content item, users geographically close to the particular user, users who viewed the same content item, a random sampling of users, or all users. In another aspect, the historical playback data may be associated with the content item itself, rather than being related to the user. For example, particular content types (e.g., sporting events) may have a shorter amount of time from the time the content item was recorded to the predicted time window than other content types (e.g., movies, children's shows, cartoons). The machine-learning module 117 may be configured to receive an indication of a new request to record a content item. Using the trained model, the machine-learning module 117 may determine a predicted time window for the content item to be watched. The predicted time window may be associated with and/or stored with information for the request to record the content item in, for example, the session index of the session module 113. For example, the predicted time window may be associated with and/or stored with the content item. For example, the predicted time window may be indicated in all or a portion of the content segments for the recorded content item. For example, an indicator of the predicted time window may be added to and stored in all or a portion of the content segments for the recorded content item. For example, the predicted time window may be stored in the header, the metadata, or another portion of each content segment of the portion of the content segments for the recorded content item. For example, the predicted time window may include a content identifier that uniquely identifies the content item from other content items. For example, the predicted time window may include a user identifier or other information (e.g., URL, MAC address) that identifies the user and/or computing device 110D from which the request to record the content item was made.

The computing device 110B may comprise a manifest agent 119. The manifest agent 119 may monitor the session index of the session module 113 to identify content items that have been recorded but not yet watched for one or more users associated with one or more computing devices 110D. For example, the manifest agent 119 may determine if the recorded content item has been already viewed by the user or at the computing device 110D before the predicted time window for viewing the recorded content item has been reached. For example, the manifest agent 119 may determine if the recorded content item or the request to record the content item was previously deleted for the user/computing device 110D before the predicted time window was reached.

For example, the manifest agent 119 may determine if the predicted time window has been reached for the recorded content item. For example, the manifest agent 119 may determine if the predicted time window has been reached based on the recorded content item having not been previously viewed by the user or at the computing device 110D and/or the recorded content item or the request to record the content item having not been previously deleted by the user/computing device 110D. For example, the manifest agent 119 may compare a current time (i.e., the present time) to the predicted time window to determine if the current time is within the predicted time window for the recorded content item or within a threshold amount of time before the beginning (e.g., the predicted earliest viewing time) of the predicted time window. Based on a determination that the current time is within the predicted time window or within a threshold time before the beginning of the predicted time window for viewing the recorded content item, the manifest agent 119 may request that a manifest for the recorded content item be determined and/or generated and stored in, for example, the intelligent cache 115.

The manifest agent 119 may further be configured to determine if the predicted time window for the recorded content item has expired (i.e., the current time is later than the end of the predicted time window, the predicted latest viewing time) or the current time satisfies a threshold time past the predicted latest viewing time of the predicted time window for viewing the recorded content item. Based on a determination that the predicted time window has expired or the current time satisfies a threshold time past the predicted latest viewing time of the predicted time window, the manifest agent 119 may delete or cause the manifest for the recorded content item to be deleted from the intelligent cache 115.

For example, a threshold time period for archiving a recorded content item for a particular user or computing device 110D may be less than a determined predicted time window, or at least less than the predicted latest viewing time of the predicted time window for a recorded content item. This may result in the recorded content item being archived before the user watches the recorded content item.

For example, a determination of whether to reconstitute the archived content item, before a request to watch the recorded content item is received from a user or user device 110D and within the predicted time window, may be made based on a confidence level (e.g., a percentage, value, or score). The confidence level may indicate the likelihood the computing device will receive a request from the user to watch the recorded content item or the likelihood that the predicted time window is correct. For example, the confidence level may be based on the predicted time window and the content type for the recorded content item. For example, the confidence level may be associated with and/or stored with the recorded content item. For example, the confidence level may be indicated in all or a portion of the content segments for the recorded content item. For example, an indicator of the confidence level may be added to and stored in all or a portion of the content segments for the recorded content item. For example, the confidence level may be stored in the header, the metadata, or another portion of each content segment of the portion of the content segments for the recorded content item.

For example, the machine-learning module 117 may determine for each content type a confidence level that the predicted time window will be correct. For example, the manifest agent 119 may query the machine-learning module to obtain the confidence level based on the content type for the recorded content item. For example, the manifest agent 119 may determine that the confidence level satisfies a confidence threshold by comparing the confidence level to the confidence threshold. For example, based on the confidence level satisfying the confidence threshold (e.g., greater than or greater than or equal to the confidence threshold), at least a portion of the archived content item may be reconstituted as a portion of the recorded content item. For example, the portion may comprise all or less than all of the recorded content item. For example, the amount of archived content item reconstituted into the recorded content item may be based on the confidence level that the predicted time window will be correct. For example, as the confidence level increases, the amount of the archived content item that is reconstituted into the recorded content item will increase. For example, the archive agent 141 may manage the reconstituting of the recorded content item from the archived content item.

The system 100 may comprise a computing device 110D. The computing device 110D may be in communication with each device shown in the system 100. The computing device 110D may comprise a content/media player, a set-top box, a client device, a smart device (e.g., a smart phone, a tablet computing device, a smart watch, etc.), a mobile device, a user device, etc. As further described herein, the computing device 110D may record or request that one or more content items be recorded, may request to view the one or more recorded content items, may request to cancel or delete one or more recorded content items, and/or may output or cause the output of the one or more content items. The computing device 110D may interact with the computing device 110C (e.g., a just-in-time packager) when requesting and/or receiving portions of content items.

Each of the transcoded content 121 may correspond to a plurality of adaptive bitrate (ABR) representations of the source content 102. For example, the transcoded content 121 may differ from each other with respect to audio bitrate, a number of audio channels, an audio CODEC, a video bitrate, a video frame size, a video CODEC, a combination thereof, and/or the like. The one or more transcoded content 121 may be sent to the computing device 110C (e.g., a just-in-time packager), as further described herein. For example, the source content 102 (e.g., a mezzanine feed) may be used to generate one or more representations of a content item that have varying bitrates and/or alternative CODECs on—the-fly. As an example, a CODEC switch from an H.264/advanced audio coding (AAC) input stream to a VP8 representation and a Vorbis representation may be performed. Audio formats may be switched from a first format to another (e.g., from a surround sound format to a stereo format). The transcoder 120 may transcode the source content 102 such that key frames (e.g., intra-coded frames (I-frames)) in each of the transcoded content 121 occur at the same time as in the source content 102. That is, each of the transcoded content 121 may be "key frame aligned" to enable seamless switching between different ABR representations by a destination device (e.g., the computing device 110D).

The segment packetizer 130 may comprise a segmenter 131. The segmenter 131 may divide a set of ABR representations (e.g., the transcoded content 121) into media segments. For example, the segmenter 131 may receive a target segment duration. The target duration may be, for example, approximately ten thousand milliseconds. The target segment duration may be received via user input, determined via a configuration file at the computing device 110A, determined based on properties of the source content 102, received via the computing device 110A, a combination thereof, and/or the like. For example, if the target segment duration is ten seconds, the segmenter 131 may process the incoming transcoded content 121 and break the transcoded content 121 into segments at key frame boundaries approximately ten seconds apart. If the transcoded content 121 includes separate video and audio content, the segmenter 131 may generate the segments such that the video and audio content are timecode aligned.

The computing device 110A may support multiple content segmentation types. The segmenter 131 may generate segments for each of the content segmentation types supported by the computing device 110A. Segments may alternately be referred to as "chunks." The computing device 110A may support both multiplexed segments (video and audio data included in a single multiplexed stream) and non-multiplexed segments (video and audio data included in separate non-multiplexed streams). Further, in the case of MPEG-DASH and/or HLS, the computing device 110A may support container formats in compliance with international standards organization base media file format (e.g., ISOBMFF, associated with a file extension ".m4s"), motion picture experts group 2 transport stream (e.g., MPEG-TS), extensible binary markup language (e.g., EBML), WebM, Matroska, or any combination thereof.

The segmenter 131 may employ a "smart" storage system of audio/video data. In one example, if the computing device 110A supports N content segmentation types (where N is an integer greater than zero), the segmenter 131 may generate N segment templates 133 for each segment (e.g., ten second portion) of each of the transcoded content 121. Each segment template 133 may comprise header information associated with a content segmentation type, data indicating a start position or start time of the segment in the source content 102, and data indicating an end position or end time of the segment in the source content 102. In the example of MPEG-DASH and/or HLS content, different segment templates may be generated for ISOBMFF multiplexed ("muxed"), ISOBMFF non-multiplexed ("demuxed"), MPEG-TS muxed, MPEG-TS demuxed, EBML muxed, EBML demuxed, etc. As the segment templates 133 are generated, the segmenter 131 may generate and/or send segment information 135 regarding the segment templates 133 and the underlying segment audio/video data 134 corresponding to the particular segment. The segmenter 131 may send the segment information 135 to a manifest generator 140.

The manifest generator 140 may generate one or more manifests (e.g., manifest files) based on the segment information 135 received from the segment packetizer 130. In the case of MPEG-DASH and/or HLS, the manifest may be a MPEG-DASH media presentation description (MPD) file. The manifest generator 140 may generate one or more manifests based on a manifest type and/or a content segmentation type. For example, the manifest generator 140 may generate, based on the segment information 135, a manifest 160. The manifest 160 may comprise a URL template 161. The URL template 161 may be number-based or time-based. A URL template 161 that is number-based may be used by the computing device 110D to construct URLs to request individual segments (e.g., portions) according to corresponding segment number. A URL template 161 that is time-based may be used by the computing device 110D to construct URLs to request individual segments according to a corresponding segment start time. If the manifest type is list-based, the manifest generator 140 may generate, based on the segment information 135, a manifest 160 that comprises a list of URLs 162. The list of URLs may include URLs that are specific to one or more segments of one or more ABR representations.

The manifest 160 may identify one or more segments of one or more adaptive streaming representations of the source content 102. For example, the transcoded content 121 generated by the transcoder 120 may include three ABR representations of the source content 102: a first representation with a bit rate of 2 megabits per second (Mbps) and a frame size of 720p, a second representation with a bit rate of 750 kilobits per second (Kbps) and a frame size of 160p, and a third representation with a bit rate of 250 kbps and a frame size of 120p. More, fewer, and/or different adaptive bitrate representations may be generated by the transcoder 120, where each generated adaptive bitrate representation(s) may have a plurality of key frame aligned segments. The manifest generator 140 may generate manifests based on the segment information 135 from the segment packetizer 130, including information associated with the segment(s) of the adaptive bitrate representation(s) generated by the transcoder 120.

While FIG. 1 only shows one computing device 110D (e.g., one client/playback device), it is to be understood that the system 100 may comprise any number of computing devices (e.g., user devices) that record, request to record, output, and/or cause to be output content items (or portions thereof). A different manifest 160 may be generated for each computing device (e.g., each client/playback device) that requests a manifest for a particular content item (or portion thereof), such as a recorded content item, even if two or more computing devices specify the same manifest type and content segmentation type for the same recorded content item. For example, the manifest 160 may be specific to the computing device 110D. Each URL or URL template in the manifest 160 may include embedded session information that identifies the computing device 110D. The session information may be used to uniquely identify the requester of a segment.

The system 100 may comprise a computing device 110C. The computing device 110C may comprise a packaging device, such as a just-in-time packager. The computing device 110C may be in communication with each device shown in the system 100. The computing device 110C may receive a manifest 160 for a particular content item (or portion thereof) from the intelligent cache 115. The computing device 110C may receive requests for segments (e.g., portions) of the content item from the computing device 110D according to the manifest 160. The computing device 110C may retrieve corresponding transcoded segments of the content item from the computing device 110A (e.g., via the storage medium 132), prepare/package the transcoded segments for output by the computing device 110D or for the computing device 110D to cause to be output at another computing device associated or communicably coupled to the computing device 110D, and deliver the requested segments to the computing device 110D.

Figure 2:
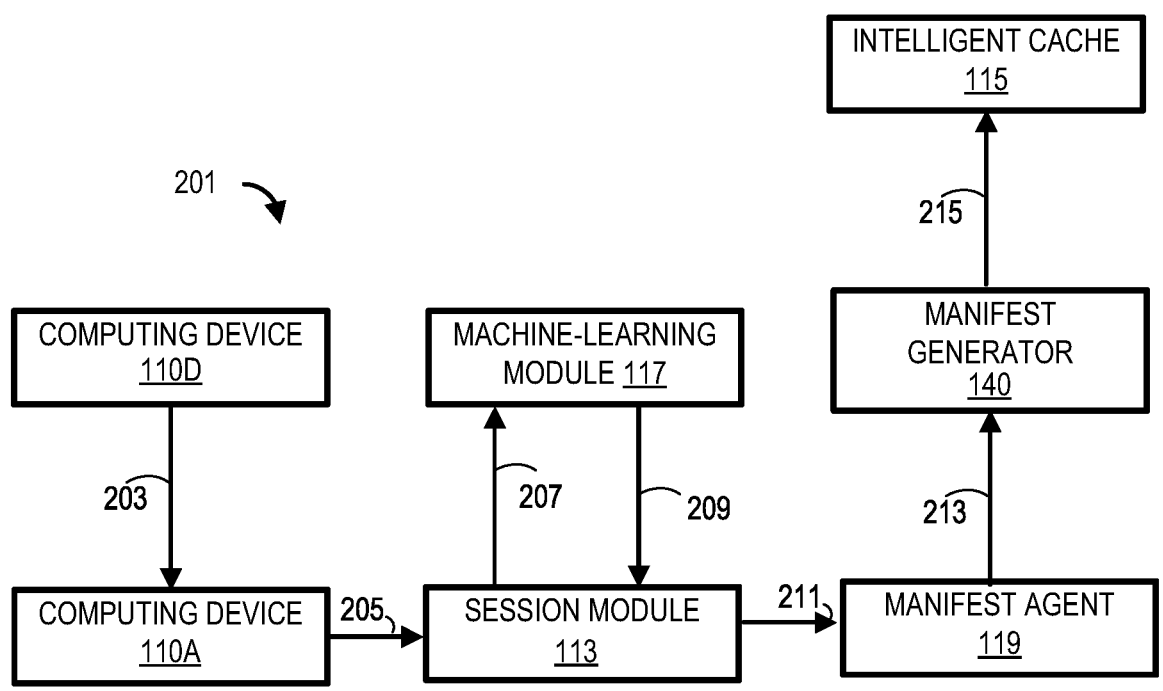
FIG. 2 shows an example view of an example system.

FIG. 2 shows an example view 201 of the system 100 that highlights certain components/modules of the system 100 that are used during a recording and preparation for playback process for a recorded content item. Interactions between the devices/entities shown in FIG. 2 during the recording and preparation for playback process are shown as actions 203-215. As discussed herein, the computing device 110A may record one or more content items and/or output the one or more recorded content items (e.g., after the recording is complete or concurrently while recording). At 203, the computing device 110D may send a request to record a content item. The computing device 110D may send the request to the computing device 110A (e.g., the recording agent). The request may include an identifier (e.g., name, content ID, etc.) for the content item to be recorded, the time the content item will be airing (e.g., when to begin recording), a device ID (e.g., device number, MAC address, phone number, URL, etc.) that uniquely identifies the computing device 110D, and/or a user ID (e.g., a user name, phone number, customer number, address, etc.).

At 205, the computing device 110A may forward the request to the session module 113. The session module 113 may receive the request and store information about the request in the session index. The information to be stored in the session index may include the content identifier, the time the request to record the content item was made, the time the content item will be airing, the content type for the content item, the content rating for the content item, the duration of the content item, and/or a number of times the content item has been scheduled to air. All or any portion of the content information may be determined based on information in the request to record the content item and/or metadata for the content item. The information to be stored may also include user information (e.g., user name, user ID, location of the user, computing device 110D ID, user gender, user age, prior requests to record content for the user, etc.). The information may be stored with and/or in association with (in a data table or record that includes) the request to record the content item in the session index.

At 207, the machine-learning module 117 may receive an indication of a recording of a content item for subsequent viewing by a user associated with the user device 110D. For example, the indication may be received from the session module 113. For example, the indication may be the request to record the content item. For example, the session module may forward the request to record the content item to the machine-learning module 117. The machine-learning module 117 may use a trained model to determine a predicted time window for when a request to view the recorded content item will be received (e.g., from the user and/or the computing device 110D associated with the user). For example, the predicted time window may be determined based on the request to record the content item. For example, the predicted time window may be determined based on the content item. For example, the predicted time window may be determined based on the content type of the content item being recorded or to be recorded. For example, the predicted time window may be determined based on a duration of the content item, a scheduled airing time for the content item, the time the request to record the content item was made, a content rating for the content item, a number of times the content item has been scheduled to air, user information (e.g., age, gender, viewing habits, location, prior amount(s) of time it took the user to view a recorded content item, etc.), and/or computing device 110D information. The machine-learning module 117 may determine and/or generate the predicted time window for viewing the recorded content item.

At 209, the machine-learning module 117 may send the predicted time window for viewing the recorded content item to the session module 113. The session module 113 may receive the predicted time window for viewing the recorded content item. The session module 113 may store the predicted time window with the recorded content item, in a manifest for the recorded content item, or in the session index in a record or data element associated with or for the request to record the content item. For example, the predicted time window may be indicated in all or a portion of the content segments for the recorded content item. For example, an indicator of the predicted time window may be added to and stored in all or a portion of the content segments for the recorded content item. For example, the predicted time window may be stored in the header, the metadata, or another portion of each content segment of the portion of the content segments for the recorded content item.

The machine-learning module 117 may also determine and send a confidence level associated with the recorded content item. The confidence level may indicate the likelihood the computing device will receive a request from the user to watch the recorded content item or the likelihood that the predicted time window is correct. The confidence level may be associated with and/or stored with the content item. For example, the confidence level may be indicated in all or a portion of the content segments for the recorded content item. For example, an indicator of the confidence level may be added to and stored in all or a portion of the content segments for the recorded content item. For example, the confidence level may be stored in the header, the metadata, or another portion of each content segment of the portion of the content segments for the recorded content item.

For example, the session index of the session module 113 may comprise a queue. For example, the queue may organize a plurality of requests to record content items temporally based on the predicted time window for each particular recorded content item. For example, the queue may organize the plurality of request to record content items temporally based on the predicted earliest viewing time of the predicted time window for each particular recorded content item.

For example, the manifest agent 119 may determine if the recorded content item has been already viewed by the user or at the computing device 110D before the predicted time window for viewing the recorded content item has been reached. For example, the manifest agent 119 may determine if the recorded content item or the request to record the content item was previously deleted for the user/computing device 110D before the predicted time window was reached.

At 211, the manifest agent 119 may determine if the predicted time window has been reached for the recorded content item. For example, the manifest agent 119 may determine if the predicted time window has been reached based on the recorded content item having not been previously viewed by the user or at the computing device 110D and/or the recorded content item or the request to record the content item having not been previously deleted by the user/computing device 110D. For example, the manifest agent 119 may monitor the predicted time window associated with and/or stored with the recorded content item and compare a current time (i.e., the present time) to the predicted time window to determine, prior to a request to watch the recorded content item being received from the user, if a current time (i.e., the present time) is within the predicted time window for viewing the recorded content item or within a threshold amount of time before the beginning (e.g., the predicted earliest viewing time) of the predicted time window for viewing the recorded content item. For example, the manifest agent 119 may compare the current time (which may include a date or be represented by the amount of time that has elapsed since the recorded content item was recorded) to the predicted time window (which may include a date and time or may be represented by the amount of time after the recorded content item was recorded. The manifest agent 119 may determine that the current time is within the predicted time window for viewing the recorded content item or within a threshold amount of time before the beginning (e.g., the predicted earliest viewing time) of the predicted time window for viewing the recorded content item.

At 213, based on the determination that the current time is within the predicted time window or within a threshold time before the beginning of the predicted time window for viewing the recorded content item, the manifest agent 119 may send a request to the manifest generator 140 to generate a manifest for the recorded content item. The request to generate the manifest may be sent before the user requests to watch the recorded content item and may be generated and sent based on the current time being within the predicted time window or within a threshold time before the beginning of the predicted time window for viewing the recorded content item. The manifest generator 140 may receive the request to generate the manifest for the recorded content item. The manifest generator 140 may generate all or a portion of the manifest for the recorded content item prior to the request to watch the recorded content item being sent by the user via the computing device 110D.

At 215, the manifest generator 140 or another portion of the computing device 110A may send the manifest for the recorded content item to the intelligent cache 115. The intelligent cache may receive the manifest for the recorded content item and store the manifest in the intelligent cache 115. When a request to watch the content is received from the user and/or the computing device 110D, the manifest will be ready to be immediately sent to the computing device 110D to reduce the amount of time between the request to watch the recorded content item and the time the first frame of the recorded content item is received by the computing device 110D.

Figure 3:
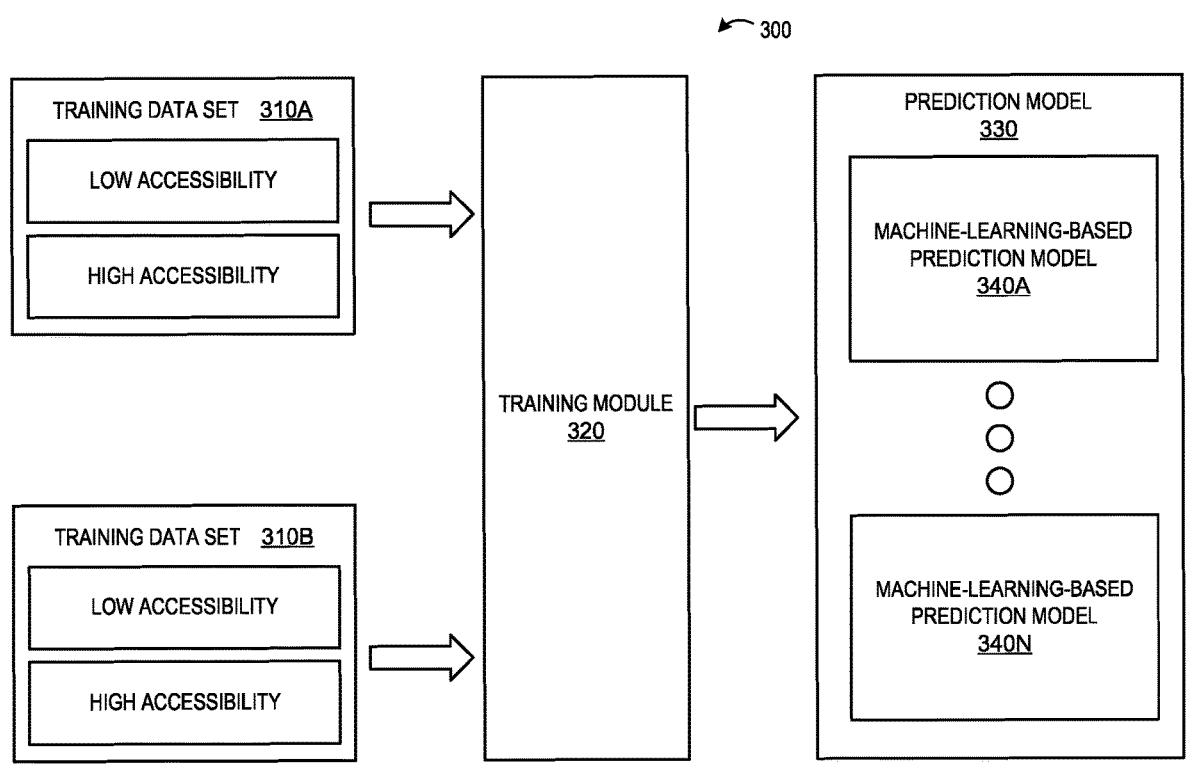
FIG. 3 shows an example system.

Machine learning and other artificial intelligence techniques may be used to train a prediction model. The prediction model, once trained, may be configured to determine a predicted time window for receiving a request to watch a recorded content item. For example, any one or more of the computing devices 110A-D of the system 100 may use the trained prediction model to determine the predicted time window for a recorded content item. The prediction model (referred to herein as the at least one prediction model 330, or simply the prediction model 330) may be trained by a system 300 as shown in FIG. 3.

The system 300 may be configured to use machine-learning techniques to train, based on an analysis of one or more training datasets 310A-310B by a training module 320, the at least one prediction model 330. The at least one prediction model 330, once trained, may be configured to provide a predicted time window for receiving a request to watch a recorded content item. A dataset indicative of a plurality of recorded content items and the amount of time that elapsed between the time the respective one of the plurality of recorded content items was recorded and the time that the associated user requested to watch the respective recorded content item of the plurality of recorded content items may be used by the training module 320 to train the at least one prediction model 330. Each of the plurality of recorded content items in the dataset may be associated with one or more multimodal features of a plurality of multimodal features that are associated with the recorded content item. The plurality of multimodal features and the predetermined viewing window for each of the plurality of recorded content items may be used to train the at least one prediction model 330.

The training dataset 310A may comprise a first portion of the plurality of recorded content items in the dataset. Each recorded content item in the first portion may have a labeled (e.g., predetermined) viewing window (e.g., a time span, such as from the time the recorded content item was recorded, within which a request to watch the recorded content item is received) and one or more labeled multimodal features associated with the recorded content item. The training dataset 310B may comprise a second portion of the plurality of recorded content items in the dataset. Each recorded content item in the second portion may have a labeled (e.g., predetermined) viewing window (e.g., a time span, such as from the time the recorded content item was recorded, within which a request to watch the recorded content item is received) and one or more labeled multimodal features associated with the recorded content item. The plurality of recorded content items may be randomly assigned to the training dataset 310A, the training dataset 310B, and/or to a testing dataset. In some implementations, the assignment of recorded content items to a training dataset or a testing dataset may not be completely random. In this case, one or more criteria may be used during the assignment, such as ensuring that similar numbers of recorded content items with different viewing windows and/or multimodal features are in each of the training and testing datasets. In general, any suitable method may be used to assign the recorded content items to the training or testing datasets, while ensuring that the distributions of viewing windows and/or multimodal features are somewhat similar in the training dataset and the testing dataset.

The training module 320 may use the first portion and the second portion of the plurality of recorded content items to determine one or more multimodal features that are indicative of an accurate (e.g., a high confidence level for the) predicted time window. That is, the training module 320 may determine which multimodal features associated with the plurality of recorded content items are correlative with an accurate predicted time window. The one or more multimodal features indicative of an accurate predicted time window may be used by the training module 320 to train the prediction model 330. For example, the training module 320 may train the prediction model 330 by extracting a feature set (e.g., one or more multimodal features) from the first portion in the training dataset 310A according to one or more feature selection techniques. The training module 320 may further define the feature set obtained from the training dataset 310A by applying one or more feature selection techniques to the second portion in the training dataset 310B that includes statistically significant features of positive examples (e.g., accurate predicted time windows) and statistically significant features of negative examples (e.g., inaccurate predicted time windows). The training module 320 may train the prediction model 330 by extracting a feature set from the training dataset 310B that includes statistically significant features of positive examples (e.g., accurate predicted time windows) and statistically significant features of negative examples (e.g., inaccurate predicted time windows).

The training module 320 may extract a feature set from the training dataset 310A and/or the training dataset 310B in a variety of ways. For example, the training module 320 may extract a feature set from the training dataset 310A and/or the training dataset 310B using a multimodal detector. The training module 320 may perform feature extraction multiple times, each time using a different feature-extraction technique. In one example, the feature sets generated using the different techniques may each be used to generate different machine-learning-based prediction models 340. For example, the feature set with the highest quality metrics may be selected for use in training. The training module 320 may use the feature set(s) to build one or more machine-learning-based prediction models 340A-340N that are configured to provide a predicted time window for a recorded content item.

The training dataset 310A and/or the training dataset 310B may be analyzed to determine any dependencies, associations, and/or correlations between multimodal features and the predetermined viewing windows in the training dataset 310A and/or the training dataset 310B. The identified correlations may have the form of a list of multimodal features that are associated with different predetermined viewing windows. The multimodal features may be considered as features (or variables) in the machine-learning context. The term "feature," as used herein, may refer to any characteristic of an item of data that may be used to determine whether the item of data falls within one or more specific categories or within a range. By way of example, the features described herein may comprise one or more multimodal features.

A feature selection technique may comprise one or more feature selection rules. The one or more feature selection rules may comprise a multimodal feature occurrence rule. The multimodal feature occurrence rule may comprise determining which multimodal features in the training dataset 310A occur over a threshold number of times and identifying those multimodal features that satisfy the threshold as candidate features. For example, any multimodal features that appear greater than or equal to 5 times in the training dataset 310A may be considered as candidate features. Any multimodal features appearing less than 5 times may be excluded from consideration as a feature. Other threshold numbers may be used as well.

A single feature selection rule may be applied to select features or multiple feature selection rules may be applied to select features. The feature selection rules may be applied in a cascading fashion, with the feature selection rules being applied in a specific order and applied to the results of the previous rule. For example, the multimodal feature occurrence rule may be applied to the training dataset 310A to generate a first list of multimodal features. A final list of candidate multimodal features may be analyzed according to additional feature selection techniques to determine one or more candidate multimodal feature groups (e.g., groups of multimodal features that may be used to predict a viewing window for receiving a request to watch the recorded content item). Any suitable computational technique may be used to identify the candidate multimodal feature groups using any feature selection technique such as filter, wrapper, and/or embedded methods. One or more candidate multimodal feature groups may be selected according to a filter method. Filter methods include, for example, Pearson's correlation, linear discriminant analysis, analysis of variance (ANOVA), chi-square, combinations thereof, and the like. The selection of features according to filter methods are independent of any machine-learning algorithms used by the system 300. Instead, features may be selected on the basis of scores in various statistical tests for their correlation with the outcome variable (e.g., a predicted time window).

As another example, one or more candidate multimodal feature groups may be selected according to a wrapper method. A wrapper method may be configured to use a subset of features and train the prediction model 330 using the subset of features. Based on the inferences that drawn from a previous model, features may be added and/or deleted from the subset. Wrapper methods include, for example, forward feature selection, backward feature elimination, recursive feature elimination, combinations thereof, and the like. For example, forward feature selection may be used to identify one or more candidate multimodal feature groups. Forward feature selection is an iterative method that begins with no features. In each iteration, the feature which best improves the model is added until an addition of a new variable does not improve the performance of the model. As another example, backward elimination may be used to identify one or more candidate multimodal feature groups. Backward elimination is an iterative method that begins with all features in the model. In each iteration, the least significant feature is removed until no improvement is observed on removal of features. Recursive feature elimination may be used to identify one or more candidate multimodal feature groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more candidate multimodal feature groups may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 320 has generated a feature set(s), the training module 320 may generate the one or more machine-learning-based prediction models 340A-340N based on the feature set(s). A machine-learning-based prediction model (e.g., any of the one or more machine-learning-based prediction models 340A-340N) may refer to a complex mathematical model for data classification that is generated using machine-learning techniques as described herein. In one example, a machine-learning-based prediction model may include a map of support vectors that represent boundary features. By way of example, boundary features may be selected from, and/or represent the highest-ranked features in, a feature set.

The training module 320 may use the feature sets extracted from the training dataset 310A and/or the training dataset 310B to build the one or more machine-learning-based prediction models 340A-340N for each classification category (e.g., viewing window ranges). In some examples, the one or more machine-learning-based prediction models 340A-340N may be combined into a single machine-learning-based prediction model 340 (e.g., an ensemble model). Similarly, the prediction model 330 may represent a single classifier containing a single or a plurality of machine-learning-based prediction models 340 and/or multiple classifiers containing a single or a plurality of machine-learning-based prediction models 340 (e.g., an ensemble classifier).

The extracted features (e.g., one or more candidate multimodal features) may be combined in the one or more machine-learning-based prediction models 340A-340N that are trained using a machine-learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting prediction model 330 may comprise a decision rule or a mapping for each candidate multimodal feature in order to assign a predicted time window to a class (e.g., viewing window ranges). As described further herein, the resulting prediction model 330 may be used to provide predicted time windows for when a request to watch a recorded content item will be received in association with the request to record the content item. The candidate multimodal features and the prediction model 330 may be used to predict viewing windows for receiving a request to watch recorded content items in the testing dataset (e.g., a third portion of the plurality of recorded content items).

Figure 4:
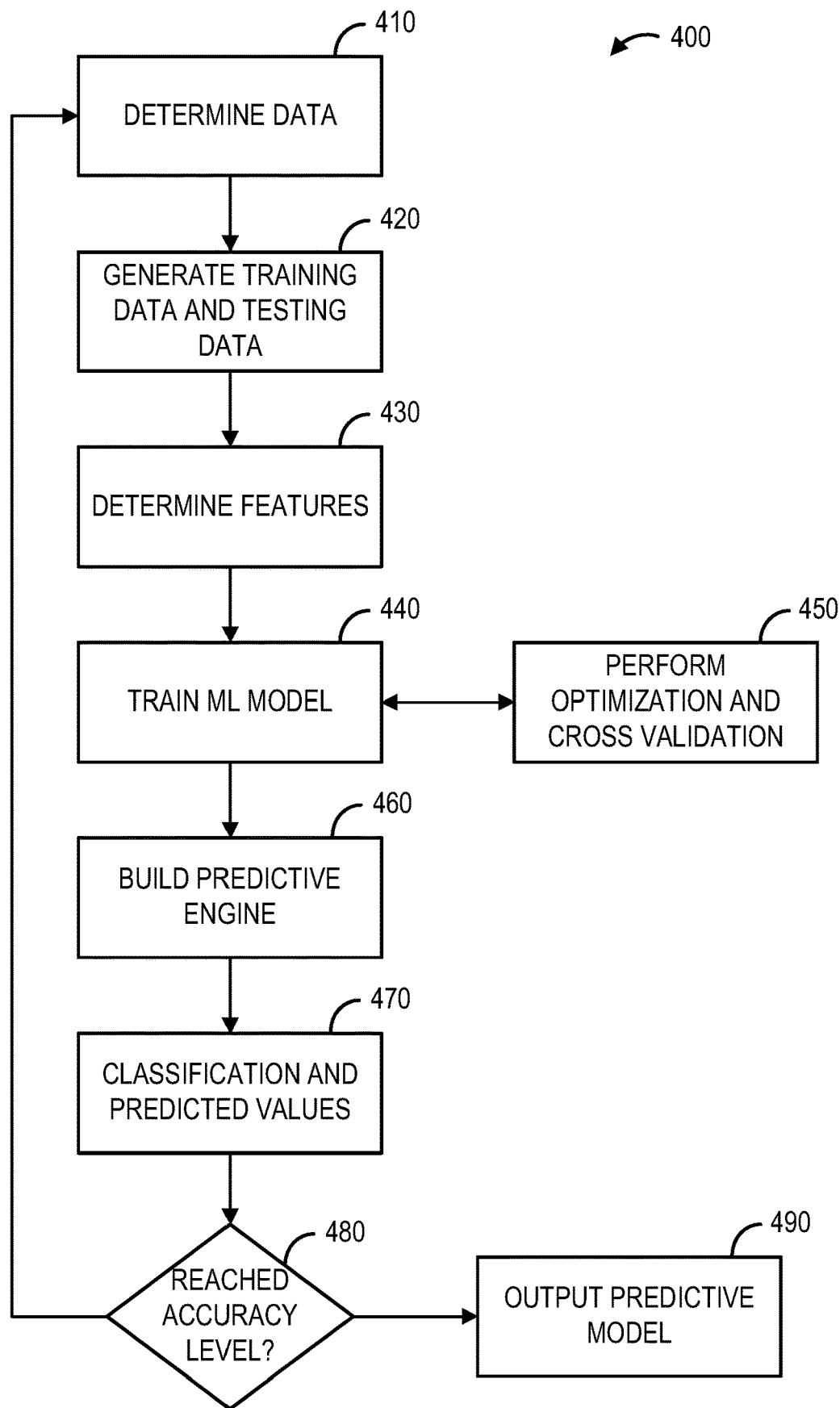
FIG. 4 shows a flowchart for an example method.

FIG. 4 is a flowchart illustrating an example training method 400 for generating the prediction model 330 using the training module 320. The training module 320 can implement supervised, unsupervised, and/or semi-supervised (e.g., reinforcement based) machine learning-based prediction models 340A-340N. The method 400 illustrated in FIG. 4 is an example of a supervised learning method; variations of this example of training method are discussed below, however, other training methods can be analogously implemented to train unsupervised and/or semi-supervised machine-learning models. The method 400 may be implemented by any one or more of the computing devices 110A-D.

At 410, the training method 400 may determine (e.g., access, receive, retrieve, etc.) first recorded content items (e.g., the first portion of the plurality of recorded content items described above) and second recorded content items (e.g., the second portion of the plurality of recorded content items described above). The first recorded content items and the second recorded content items may each comprise one or more multimodal features and a predetermined viewing window or viewing time (e.g., the amount of time that elapsed between the time the content item was recorded and the time a request was received to watch the recorded content item. The training method 400 may generate, at 420, a training dataset and a testing dataset. The training dataset and the testing dataset may be generated by randomly assigning recorded content items from the first recorded content items and/or the second recorded content items to either the training dataset or the testing dataset. In some implementations, the assignment of recorded content items as training or test samples may not be completely random. As an example, only the recorded content items for a specific multimodal feature(s) and/or range(s) of viewing windows or elapsed times may be used to generate the training dataset and the testing dataset. As another example, a majority of the recorded content items for the specific multimodal feature(s) and/or range(s) of viewing windows or elapsed times may be used to generate the training dataset. For example, 75% of the recorded content items for the specific multimodal feature(s) and/or range(s) of viewing windows or elapsed times may be used to generate the training dataset and 25% may be used to generate the testing dataset.

The training method 400 may determine (e.g., extract, select, etc.), at 430, one or more features that can be used by, for example, a classifier to differentiate among different classifications (e.g., viewing windows or elapsed times). The one or more features may comprise a set of multimodal features. As an example, the training method 400 may determine a set features from the first recorded content items. As another example, the training method 400 may determine a set of features from the second recorded content items. In a further example, a set of features may be determined from other recorded content items of the plurality of recorded content items (e.g., a third portion) associated with a specific multimodal feature(s) and/or range(s) of viewing windows or elapsed times that may be different than the specific multimodal feature(s) and/or range(s) of viewing windows or elapsed times associated with the recorded content items of the training dataset and the testing dataset. In other words, the other recorded content items (e.g., the third portion) may be used for feature determination/selection, rather than for training. The training dataset may be used in conjunction with the other recorded content items to determine the one or more features. The other recorded content items may be used to determine an initial set of features, which may be further reduced using the training dataset.

The training method 400 may train one or more machine-learning models (e.g., one or more prediction models) using the one or more features at 440. In one example, the machine-learning models may be trained using supervised learning. In another example, other machine-learning techniques may be employed, including unsupervised learning and semi-supervised. The machine-learning models trained at 440 may be selected based on different criteria depending on the problem to be solved and/or data available in the training dataset. For example, machine-learning models can suffer from different degrees of bias. Accordingly, more than one machine-learning model can be trained at 440, and then optimized, improved, and cross-validated at 450.

The training method 400 may select one or more machine-learning models to build the prediction model 330 at 460. The prediction model 330 may be evaluated using the testing dataset. The prediction model 330 may analyze the testing dataset and generate classification values and/or predicted values (e.g., viewing windows) at 470. Classification and/or prediction values may be evaluated at 480 to determine whether such values have achieved a desired accuracy level (e.g., a confidence level for the predicted time window). Performance of the prediction model 330 may be evaluated in a number of ways based on a number of true positives, false positives, true negatives, and/or false negatives classifications of the plurality of data points indicated by the prediction model 330.

For example, the false positives of the prediction model 330 may refer to a number of times the prediction model 330 incorrectly assigned an accurate predicted time window to a recorded content item associated with a low confidence level. Conversely, the false negatives of the prediction model 330 may refer to a number of times the machine-learning model assigned an inaccurate viewing window to a recorded content item associated with a high confidence level. True negatives and true positives may refer to a number of times the prediction model 330 correctly assigned viewing windows to recorded content items based on the known, predetermined viewing times (e.g., the time a request to watch the recorded content item was received, such as the elapsed time between the time the content item was recorded and the time the request to watch the recorded content item was received, for each recorded content item. Related to these measurements are the concepts of recall and precision. Generally, recall refers to a ratio of true positives to a sum of true positives and false negatives, which quantifies a sensitivity of the prediction model 330. Similarly, precision refers to a ratio of true positives a sum of true and false positives. When such a desired accuracy level (e.g., confidence level) is reached, the training phase ends and the prediction model 330 may be output at 490; when the desired accuracy level is not reached, however, then a subsequent iteration of the training method 400 may be performed starting at 410 with variations such as, for example, considering a larger collection of recorded content items.

The prediction model 330 may be output at 490. The prediction model 330 may be configured to provide predicted time windows for recorded content items that are not within the plurality of recorded content items used to train the prediction model. For example, the prediction model 330 may be trained and output by a first computing device. The first computing device may provide the prediction model 330 to a second computing device. As described herein, the method 400 may be implemented by any one or more of the computing devices 110A-D. The first computing device may be any one of computing devices 110A-D. The second computing device may be any one of the computing devices 110A-D.

Figure 5:
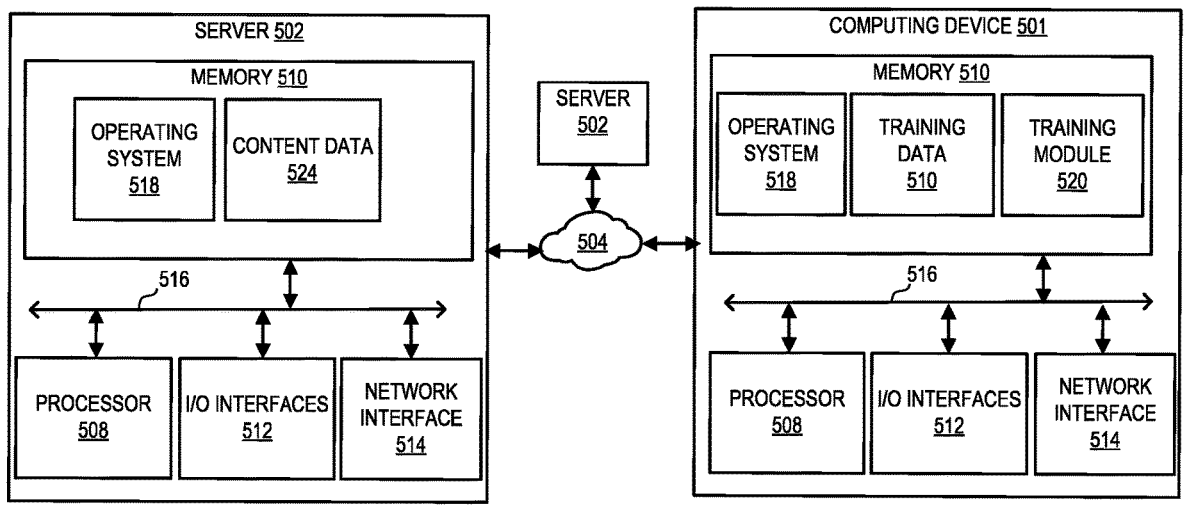
FIG. 5 shows an example system.

As discussed herein, the present methods and systems may be computer-implemented. FIG. 5 shows a block diagram depicting an environment 500 comprising non-limiting examples of a computing device 501 and a server 502 connected through a network 504, such as the network 104. The computing device 501 and/or the server 502 may be any one of the computing devices 110A-D of FIG. 1. In an aspect, some or all steps of any described method herein may be performed on a computing device as described herein. The computing device 501 can comprise one or multiple computers configured to store one or more of the training module 520, training data 510, and the like. The server 502 can comprise one or multiple computers configured to store recorded content data 524 (e.g., a plurality of recorded content items and associated predictive data (e.g., predicted time windows, confidence levels indicating the likelihood the computing device will receive a request from the user to watch the recorded content item, and/or confidence levels indicating the likelihood that the predicted time window is correct, and/or multimodal features). Multiple servers 502 can communicate with the computing device 501 via the through the network 504.

The computing device 501 and the server 502 may each be a digital computer that, in terms of hardware architecture, generally includes a one or more processors 508, memory system 510, input/output (I/O) interfaces 512, and network interfaces 514. These components (508, 510, 512, and 514) are communicatively coupled via a local interface 516. The local interface 516 can be, for example, but not limited to, one or more buses or other wired or wireless connections, as is known in the art. The local interface 516 can have additional elements, which are omitted for simplicity, such as controllers, buffers (caches), drivers, repeaters, and receivers, to enable communications. Further, the local interface may include address, control, and/or data connections to enable appropriate communications among the aforementioned components.

The one or more processors 508 can be hardware device (s) for executing software, particularly that stored in memory system 510. The one or more processors 508 can be any custom made or commercially available processor, a central processing unit (CPU), an auxiliary processor among several processors associated with the computing device 501 and the server 502, a semiconductor-based microprocessor (in the form of a microchip or chip set), or generally any device for executing software instructions. When the computing device 501 and/or the server 502 is in operation, the one or more processors 508 can be configured to execute software stored within the memory system 510, to communicate data to and from the memory system 510, and to generally control operations of the computing device 501 and the server 502 pursuant to the software.

The I/O interfaces 512 can be used to receive user input from, and/or for providing system output to, one or more devices or components. User input can be provided via, for example, a keyboard and/or a mouse. System output can be provided via a display device and a printer (not shown). I/O interfaces 512 can include, for example, a serial port, a parallel port, a Small Computer System Interface (SCSI), an infrared (IR) interface, a radio frequency (RF) interface, and/or a universal serial bus (USB) interface.

The network interface 514 can be used to transmit and receive from the computing device 501 and/or the server 502 on the network 504. The network interface 514 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi, cellular, satellite), or any other suitable network interface device. The network interface 514 may include address, control, and/or data connections to enable appropriate communications on the network 504.

The memory system 510 can include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 510 may incorporate electronic, magnetic, optical, and/or other types of storage media. Note that the memory system 510 can have a distributed architecture, where various components are situated remote from one another, but can be accessed by the one or more processors 508.

The software in memory system 510 may include one or more software programs, each of which comprises an ordered listing of executable instructions for implementing logical functions. In the example of FIG. 5, the software in the memory system 510 of the computing device 501 can comprise the training module 520 (or subcomponents thereof), the training data 510, and a suitable operating system (O/S) 518. In the example of FIG. 5, the software in the memory system 510 of the server 502 can comprise, the recorded content data 524, and a suitable operating system (O/S) 518. The operating system 518 essentially controls the execution of other computer programs and provides scheduling, input-output control, file and data management, memory management, and communication control and related services.

For purposes of illustration, application programs and other executable program components such as the operating system 518 are illustrated herein as discrete blocks, although it is recognized that such programs and components can reside at various times in different storage components of the computing device 501 and/or the server 502. An implementation of the training module 520 can be stored on or transmitted across some form of computer-readable media. Any of the disclosed methods can be performed by computer-readable instructions embodied on computer-readable media (e.g., non-transitory computer-readable media). Computer-readable media can be any available media that can be accessed by a computer. By way of example and not meant to be limiting, computer-readable media can comprise "computer storage media" and "communications media."

"Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 6:
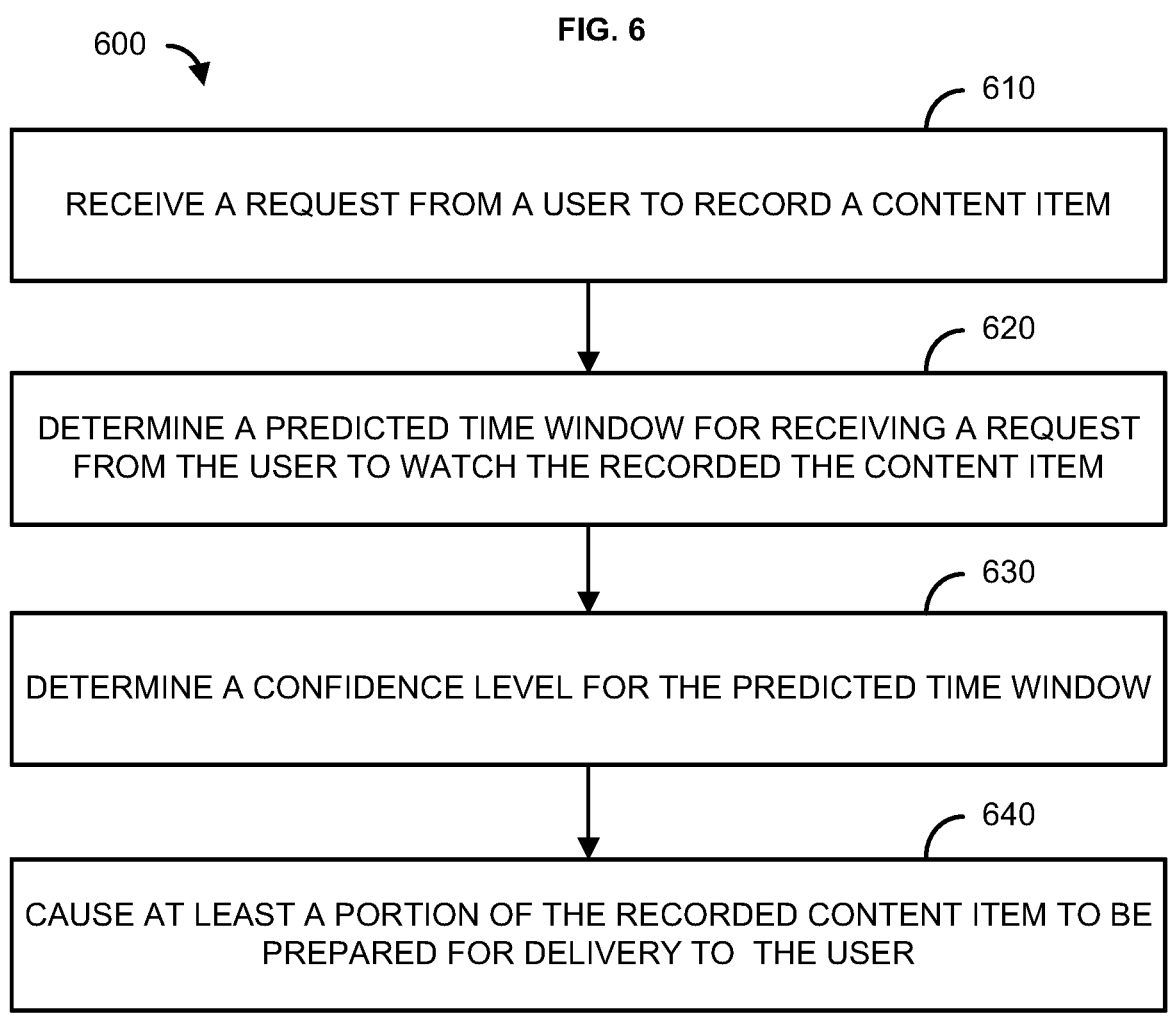
FIG. 6 shows a flowchart for an example method.

FIG. 6 shows a flowchart of an example method 600 for improving playback of recorded content items. The methods described in FIG. 6 may be completed by a computing device, such as the computing device 110B or any other computing device described herein. While the method 600 of FIG. 6 will be described as being completed by the computing device 110B this is for example purposes only.

A user, via, for example, the computing device 110D associated with the user, may send a request to record a content item (e.g., a sporting event, episode of a television show, movie, concert, news program, a special event, etc.). For example, the user may send, via the computing device 110D, the request to one or more of the computing devices 110A-C. The request may comprise an identifier (e.g., name, content ID, etc.) for the content item, a time the content item will be airing (e.g., when to begin recording), a device ID (e.g., a device number, MAC address, phone number, URL, etc.) that uniquely identifies the computing device 110D, and/or a user ID (e.g., a user name, phone number, customer number, address, etc.) that identifies the user making the request.

At 610, the computing device 110A-C may receive the request to record the content item. The request to record the content item may be received from the user via the computing device 110D and the network 104. The computing device 110A-C may determine when to begin recording the content item. For example, the recording agent 105 may evaluate the request and determine when to begin recording the content item. When the time comes, the recording agent 105 may further facilitate the recording of the content item and storage of the recorded content item in the database 137.

The computing device 110B may receive of the request to record the content item. For example, the request may be received by one or more of the session module 113 and/or the machine-learning module 117. For example, the session module 113 may receive the request or an indication of the request and store information about the request in the session index. The information stored in the session index may include the content identifier, the time the request to record the content item was made, the time the content item will be airing, the content type or genre for the content item, the content rating for the content item, the duration of the content item, and/or the number of times the content item has been scheduled to air. Portions of the content information may not be in the request but may be determined based on metadata for the content item. The session module 113 may also store the user information in the session index in association with the recorded content item and/or the request to record the content item.

The machine-learning module 117 may receive the request or an indication of the request to record the content item. At 620, a predicted time window for receiving a request to watch the recorded content item may be determined. For example, the predicted time window may be determined by the computing device 110B. For example, the predicted time window may be determined by the machine-learning module 117 of the computing device 110B. For example, the predicted time window may be determined based on a trained model. For example, the trained model may be determined by the machine-learning module 117 based on historical playback data. For example, the predicted time window may be determined based on the content item identified in the indication. For example, the predicted time window may be determined based on the content type or genre (e.g., a movie, a sporting event, a concert, a news program, a sit-com program, a drama program, a children's program, a cartoon program, etc.) for the content item. For example, the predicted time window may be determined based on one or more of the content type for the content item, the duration of the content item, a scheduled airing time for the content item, a content rating for the content item, a number of times the content item has been scheduled to air, the time the request to record the content item was received, and/or user data associated with the user requesting to record the content item. The user data may include one or more of user name, user ID, location of the user, computing device 110D ID, user gender, user age, prior requests to record content items for the user, the amount of time the user took to request to watch other recorded content items, etc. The predicted time window may be determined based on whether the recorded content was live, real time, or time-shifted content. The trained model may be trained based on one or more of the above information associated with the content item or the user.

The predicted time window may be stored with or associated with the recorded content item and/or the request to record the content item. For example, the predicted time window may include a content identifier that uniquely identifies the content item from other content items. For example, the predicted time window may include a user identifier or other information (e.g., URL, MAC address, user ID, user name, user number, device ID, etc.) that identifies the user and/or computing device 110D from which the request to record the content item was made. For example, the predicted time window may be stored in the session index of the session module 113 and associated with the content item, and/or data for the request to record the content item (e.g., included in the same database record).

For example, the computing device 110B (e.g., the session module 113) may store the predicted time window in a manifest for the recorded content item or in the session index in a record or data element associated with or for the request to record the content item. For example, the predicted time window may be associated with and/or stored with the content item. For example, the predicted time window may be indicated in all or a portion of the content segments for the recorded content item. For example, an indicator of the predicted time window may be added to and stored in all or a portion of the content segments for the recorded content item. For example, the predicted time window may be stored in the header, the metadata, or another portion of each content segment of the portion of the content segments for the recorded content item.

For example, the session index of the session module 113 may comprise a queue. For example, the queue may organize a plurality of requests to record content items temporally based on the predicted time window for each particular recorded content item. For example, the queue may organize the plurality of requests to record content items temporally based on the predicted earliest viewing time of the predicted time window for each particular recorded content item.

For example, the predicted time window may be determined based on historical playback data for a plurality of recorded content items. For example, the historical playback data may be for recorded content items requested to be recorded by the user and/or a plurality of other users. For example, the plurality of other users may share one or more traits with the user that requested to record the content item, such as gender, location (e.g., the same region of an area), or within a same age range. For example, the computing device 110B may receive the historical playback data for a plurality of recorded content items for a plurality of users. For example, the computing device 110 may store the historical playback data in the session index of the session module 113. The computing device 110B, such as the machine-learning module 117 may determine the trained model based on all or a portion of the received historical playback data for the plurality of recorded content items for the plurality of users.

At 630, a confidence level may be determined. The confidence level may indicate the likelihood the computing device will receive a request from the user to watch the recorded content item or the likelihood that the predicted time window is correct. For example, the confidence level may be determined by the computing device 110B. For example, the confidence level may be determined by the machine-learning module 117 of the computing device 110B. The confidence level may be determined based on the content item identified in the indication. For example, the confidence level may be determined based on the content type or genre of the content item. For example, the confidence level may be determined based on one or more of the predicted time window, the content type or genre for the recorded content item, user data for the user making or associated with the request, or the time the request was made. For example, the confidence level may comprise a percentage, value, or score indicating a level of certainty or percentage of amount of times that the predicted time window is correct for the recorded content item or the likelihood the computing device will receive the request from the user to watch the recorded content item. For example, the machine-learning module 117 may determine for each content type a confidence level that the predicted time window will be correct and/or the likelihood the computing device will receive the request from the user to watch the recorded content item.

The confidence level may be associated with and/or stored with the content item. For example, the confidence level may be indicated in all or a portion of the content segments for the recorded content item. For example, an indicator of the confidence level may be added to and stored in all or a portion of the content segments for the recorded content item. For example, the confidence level, or indication thereof, may be stored in the header, the metadata, or another portion of each content segment of the portion of the content segments for the recorded content item.

At 640, at least a portion of the recorded content item may be prepared for delivery or caused to be prepared for delivery to the user (e.g., to a user device associated with the user, such as the computing device 110D). For example, the portion of the content item may be prepared or caused to be prepared for delivery by the computing device 110B. For example, the at least the portion of the recorded content item may be prepared for delivery during the predicted time window or within a predetermined amount of time of (e.g., any amount of time between 1 second and 7 days before of the beginning of) the predicted time window for the recorded content item. For example the at least the portion of the recorded content item prepared for delivery may comprise all or any portion of the recorded content item and/or the manifest for the recorded content item. For example, the amount of the recorded content item prepared or caused to be prepared for delivery may be based on the confidence level. For example, as the confidence level that the computing device will receive a request from the user to watch the recorded content item and/or the confidence level that the likelihood that the predicted time window is correct increase, the amount of the recorded content item prepared for delivery or caused to be prepared for delivery may be increased. For example, the amount of the recorded content item prepared or caused to be prepared for delivery may be based on the time remaining before the predicted time window begins. For example, as the time remaining before the predicted time window begins is reduced, the amount of the recorded content item prepared or caused to be prepared for delivery may increase.

For example, a threshold time period for archiving a recorded content item for a particular user or computing device 110D may be less than a determined predicted time window, or at least less than the predicted latest viewing time of the predicted time window for viewing the recorded content item. This may result in the recorded content item being archived before the user watches the recorded content item. For example, a determination of whether to reconstitute the archived content item, before a request to watch the recorded content item is received from a user or user device 110D and within the predicted time window or within a predetermined amount of time before the beginning of the predicted time window, may be made based on the confidence level that the predicted time window is correct. For example, the manifest agent 119 may query the machine-learning module to obtain the confidence level based on the content type for the recorded content item. For example, the manifest agent 119 may determine that the confidence level satisfies a confidence threshold by comparing the confidence level to the confidence threshold. For example, based on the confidence level satisfying the confidence threshold (e.g., greater than or greater than or equal to the confidence threshold), at least a portion of the archived content item may be reconstituted as a portion of the recorded content item. For example, the portion may comprise all or less than all of the recorded content item. For example, the amount of archived content item reconstituted into the recorded content item may be based on the confidence level that the predicted time window will be correct. For example, as the confidence level increases, the amount of the archived content item that is reconstituted into the recorded content item will increase. For example, a confidence level of 50 percent may cause 25 percent of the archived content item to be reconstituted into the recorded content item; a confidence level of 60 percent may cause 50 percent of the archived content item to be reconstituted into the recorded content item; a confidence level over 65 percent may cause the entire archived content item to be reconstituted into the entire recorded content item. The percentages provided herein are for example purposes only as other combinations of percentages may replace the combinations presented herein based on accuracy of the trained model, the amount of storage available, and the desires of the system designers. For example, the archive agent 141 may manage the reconstituting of the recorded content item from the archived content item.

For example, the recorded content item may not be archived at the time the predicted time window begins or within the predetermined amount of time that the predicted time window begins and the recorded content item (e.g., a plurality of segments of the recorded content item) may be readily available to be sent to the computing device associated with the user.

For example, preparing at least a portion or causing at least the portion of the recorded content item to be prepared for delivery may comprise determining and/or creating a manifest for at least the portion of the recorded content item (e.g., all or any portion of the recorded content item). For example, the manifest agent 119 may determine if the recorded content item has been already viewed by the user or at the computing device 110D before the predicted time window for viewing the recorded content item has been reached. For example, the manifest agent 119 may determine if the recorded content item or the request to record the content item was previously deleted for the user/computing device 110D before the predicted time window was reached.

For example, one or more of the computing devices 110A-C may determine or create the manifest. For example, determining and/or creating the manifest may be based on the determination that the recorded content item has not been consumed (e.g., viewed, listened to) by the user and/or the recorded content item or the request to record the content item have not been deleted by the user (e.g., via the computing device 110D) (e.g., prior to or during the predicted time window). For example, determining or creating a manifest for at least the portion of the recorded content item may comprise determining or creating a manifest for the entirety of the recorded content item. For example, the amount of the manifest determined or created for the recorded content item may be based on the confidence level. For example, the higher the confidence level, the greater the amount of the portion of manifest for the recorded content item that is determined and/or created. For example, a confidence level of 50 percent may cause 25 percent of the manifest to be determined and/or created; a confidence level of 60 percent may cause 50 percent of the manifest to be determined and/or created; a confidence level over 65 percent may cause the entire manifest to be determined and/or created. The percentages provided herein are for example purposes only as other combinations of percentages may replace the combinations presented herein based on accuracy of the trained model, the amount of storage available, and the desires of the system designers.

For example, determining and/or creating the manifest may be further based on the predicted time window for viewing the recorded content item. The manifest agent 119 or another portion of the computing device 110B may monitor the predicted time window for viewing the recorded content item, for which information was stored in one or more segments of the recorded content item and/or the session index of the session module 113, to determine, prior to a request to watch the recorded content item being received from the user, if a current time (i.e., the present time) is within the predicted time window for viewing the recorded content item or within a threshold amount of time before the beginning (e.g., the predicted earliest viewing time) of the predicted time window for viewing the recorded content item. For example, the manifest agent 119 may compare the current time (which may include a date or be represented by the amount of time that has elapsed since the recorded content item was recorded) to the predicted time window (which may include a date and time or may be represented by the amount of time after the recorded content item was recorded). The manifest agent 119 may determine that the current time is within the predicted time window for viewing the recorded content item or within a threshold amount of time before the beginning (e.g., the predicted earliest viewing time) of the predicted time window for viewing the recorded content item. Based on the current time being within the predicted time window for viewing the recorded content item or within a threshold amount of time before the beginning of the predicted time window for viewing the recorded content item, the manifest for the recorded content item may be determined. For example, determining the manifest, or the portion of the manifest may comprise creating or causing the creation of the manifest (or portion of the manifest).

For example, the manifest for the recorded content item may be determined and/or created before the user and/or the computing device 110D associated with the initial request to record the content item sends a request to watch the recorded content item. The manifest for the recorded content item may be unique for each user requesting to record the content item. The manifest (e.g., the manifest 160) may be stored. For example, the manifest may be stored in the computing device 110B. For example, the manifest may be stored in an intelligence cache 115 included in or associated with the computing device 110B. The computing device 110D (e.g., a user device, such as a desktop computer, laptop computing, smart phone, tablet computer, smart watch, set-top box, etc.) may send a request to watch the recorded content item. For example, the user associated with the computing device 110D may send the request to watch the recorded content item. For example, the request to watch the recorded content item may occur within the predicted time window. The computing device 110B, having already created and stored the manifest for the recorded content item in the intelligence cache 115 may send the manifest to the computing device 110D. The computing device 110D may evaluate the manifest for the recorded content item and send a request the first segment for the recorded content item. For example, the request for the first segment of the recorded content item may be sent to the computing device 110C (e.g., the packager). The packager of the computing device 110C may send a request to the computing device 110A to receive the first segment of the recorded content item. The first segment of the recorded content item may be sent from the database 137 of the computing device 110A to the computing device 110C. The packager of the computing device 110C may package the first segment and send it to the computing device 110D to be output. As a result of creating the manifest for the recorded content item prior to receiving the request to watch the recorded content item, the amount of time from the request to watch the recorded content item to the first frame of the recorded content item being displayed at or caused to be displayed by the computing device 110D may be reduced.

For example, the computing device 110D may not send a request to watch the recorded content item or the request to watch the recorded content item may not be sent until a time after the predicted time window. For example, the computing device 110D may remove or delete manifests for recorded content items once the predicted time window has passed or a threshold amount of time after the end of the predicted time window. For example, the manifest agent 119 may be configured to determine if a predicted time window for a recorded content item has expired (e.g., the present time is later than the end of the predicted time window, the predicted latest viewing time) or the present time satisfies a threshold time past the predicted latest viewing time of the predicted time window for viewing the recorded content item. Based on a determination that the predicted time window has expired or the present time satisfies a threshold time past the predicted latest viewing time of the predicted time window, the manifest agent 119 may delete or cause the manifest for the recorded content item to be deleted from the intelligent cache 115. In this example, should a request to watch the recorded content item be subsequently received or indicated, the manifest for the recorded content item may be created and sent to the computing device 110D after receiving the request to watch the recorded content item.

Figure 7:
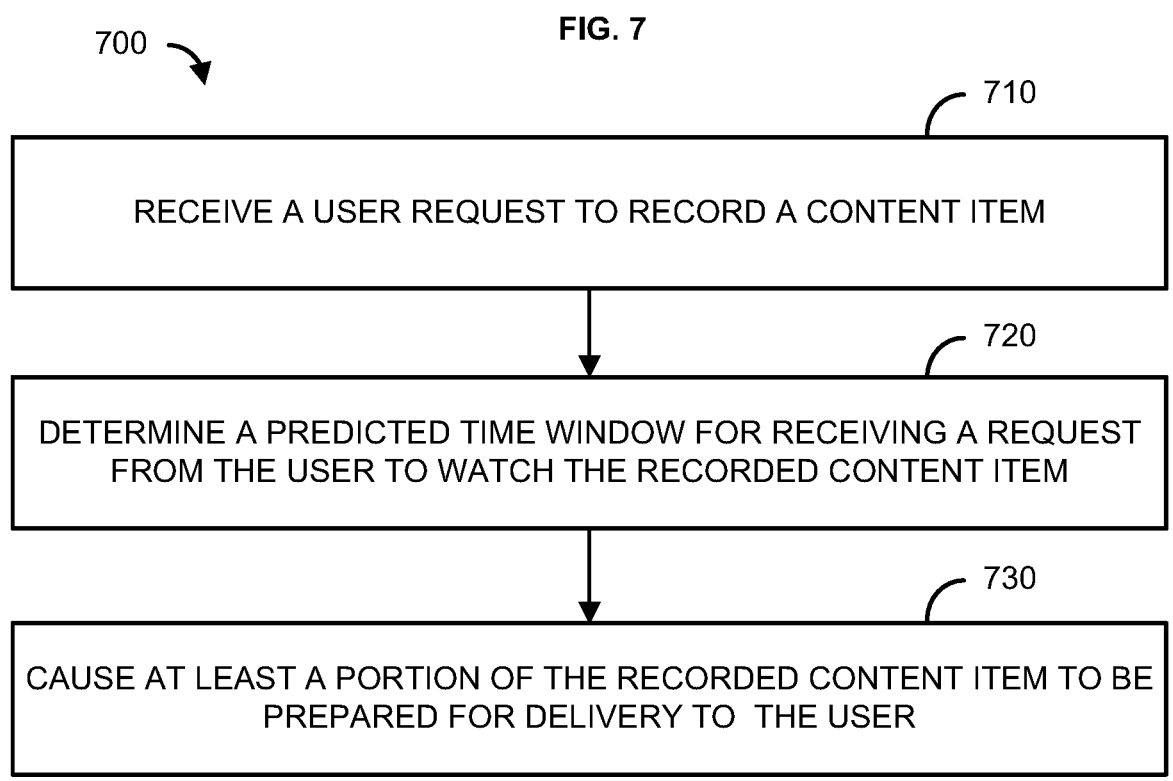
FIG. 7 shows a flowchart for an example method.

FIG. 7 shows a flowchart of an example method 700 for improving playback of recorded content items. The methods described in FIG. 7 may be completed by a computing device, such as the computing device 110B or any other computing device described herein. While the method 700 of FIG. 7 will be described as being completed by the computing device 110B this is for example purposes only.

A user, via, for example, the computing device 110D associated with the user, may send a request to record a content item (e.g., a sporting event, episode of a television show, movie, concert, news program, a special event, etc.). For example, the user may send, via the computing device 110D, the request to one or more of the computing devices 110A-C. The request may comprise an identifier (e.g., name, content ID, etc.) for the content item, a time the content item will be airing (e.g., when to begin recording), a device ID (e.g., a device number, MAC address, phone number, URL, etc.) that uniquely identifies the computing device 110D, and/or a user ID (e.g., a user name, phone number, customer number, address, etc.) that identifies the user making the request.

At 710, the computing device 110A-C may receive the request to record the content item. The request to record the content item may be received from the user via the computing device 110D and the network 104. The computing device 110A-C may determine when to begin recording the content item. For example, the recording agent 105 may evaluate the request and determine when to begin recording the content item. When the time comes, the recording agent 105 may further facilitate the recording of the content item and storage of the recorded content item in the database 137.

The computing device 110B may receive of the request to record the content item. For example, the request may be received by one or more of the session module 113 and/or the machine-learning module 117. For example, the session module 113 may receive the request or an indication of the request and store information about the request in the session index. The information stored in the session index may include the content identifier, the time the request to record the content item was made, the time the content item will be airing, the content type or genre for the content item, the content rating for the content item, the duration of the content item, and/or the number of times the content item has been scheduled to air. Portions of the content information may not be in the request but may be determined based on metadata for the content item. The session module 113 may also store the user information in the session index in association with the recorded content item and/or the request to record the content item.

Historical playback data for a plurality of recorded content items may be determined or received. For example, the historical playback data may be determined or received by the computing device 110B. For example, the historical playback data may be determined or received by the session module 113 and stored in the session index of the session module 113.

For example, the historical playback data may be determined or received based on a plurality of users requesting to record a plurality of content items over a period of time. For example, the historical playback data may be for recorded content items requested to be recorded by the user and/or a plurality of other users. For example, the plurality of other users may share one or more traits with the user that requested to record the content item, such as gender, location (e.g., the same region of an area), within a same age range. The computing device 110B, such as the machine-learning module 117 may use machine learning and determine the trained model for determining a predicted time window for receiving a request to watch recorded content based on all or a portion of the received historical playback data for the plurality of recorded content items for the plurality of users. For example, the historical playback data may comprise a content ID for each of the plurality of recorded content items, a content type for each of the plurality of recorded content items, a content rating for the each of the plurality of content items, a duration for each of the plurality of content items, a number of times each of the plurality of content items has been scheduled to air, a scheduled airing time for each of the plurality of content items, an amount of time between the time each of the plurality of content times began to be recorded and the time a request to watch the corresponding recorded content item was received (e.g., the stored timespan), and user data associated with each of the users associated with the request to record each of the plurality of recorded content items. The trained model may be used by the computing device 110B, such as the machine-learning module 117 to determine a predicted time window for each request to record a content item.

The machine-learning module 117 may receive the request or an indication of the request to record the content item. At 720, a predicted time window for receiving a request from the user to watch the recorded content item may be determined. For example, the predicted time window may be determined by the computing device 110B. For example, the predicted time window may be determined by the machine-learning module 117 of the computing device 110B. For example, the predicted time window may be determined based on the trained model. For example, the predicted time window may be determined based on the historical playback data. For example, the predicted time window may be determined based on the content item identified in the indication. For example, the predicted time window may be determined based on the content type or genre (e.g., a movie, a sporting event, a concert, a news program, a sit-com program, a drama program, a children's program, a cartoon program, etc.) for the content item. For example, the predicted time window may be determined based on one or more of the content type for the content item, the duration of the content item, a scheduled airing time for the content item, a content rating for the content item, a number of times the content item has been scheduled to air, the time the request to record the content item was received by the computing device 110A-C, and/or user data associated with the user requesting to record the content item. The user data may include one or more of user name, user ID, location of the user, computing device 110D ID, user gender, user age, prior requests to record content items for the user, the amount of time the user took to request to watch other recorded content items, etc. The predicted time window may be determined based on whether the recorded content was live, real-time, or time-shifted content. The trained model may be trained based on one or more of the above information associated with the content item and/or the user.

The predicted time window may be stored with or associated with the recorded content item and/or the request to record the content item. For example, the predicted time window may be stored with and/or associated with the metadata for the content item. For example, the predicted time window may include a content identifier that uniquely identifies the content item from other content items. For example, the predicted time window may include a user identifier or other information (e.g., URL, MAC address, user ID, user name, user number, device ID, etc.) that identifies the user and/or computing device 110D from which the request to record the content item was made. For example, the predicted time window may be stored in the session index of the session module 113 and associated with the content item, and/or data for the request to record the content item (e.g., included in the same database record).

For example, the predicted time window may be associated with and/or stored with the content item. For example, the predicted time window may be indicated in all or a portion of the content segments for the recorded content item. For example, an indicator of the predicted time window may be added to and stored in all or a portion of the content segments for the recorded content item. For example, the predicted time window, or indication thereof, may be stored in the header, the metadata, or another portion of each content segment of the portion of the content segments for the recorded content item.

For example, the computing device 110B (e.g., the session module 113) may store the predicted time window in the session index in a record or data element associated with or for the request to record the content item. For example, the session index of the session module 113 may comprise a queue. For example, the queue may organize a plurality of requests to record content items temporally based on the predicted time window for each particular recorded content item. For example, the queue may organize the plurality of requests to record content items temporally based on the predicted earliest viewing time of the predicted time window for each particular recorded content item.

A confidence level for viewing the recorded content item may be determined. For example, the confidence level may be determined by the computing device 110B. The confidence level may indicate the likelihood the computing device will receive a request from the user to watch the recorded content item or the likelihood that the predicted time window is correct. For example, the confidence level may be determined based on the content item identified in the indication. For example, the confidence level may be determined based on the content type or genre of the content item. For example, the confidence level may be determined based on one or more of the predicted time window, the content type or genre for the recorded content item, user data for the user making or associated with the request, or the time the request was made. For example, the confidence level may comprise a percentage, value, or score indicating a level of certainty or percentage of amount of times that the predicted time window is correct for the recorded content item or the likelihood the computing device will receive the request from the user to watch the recorded content item. For example, the machine-learning module 117 may determine for each content type a confidence level that the predicted time window will be correct and/or the likelihood the computing device will receive the request from the user to watch the recorded content item.

The confidence level may be associated with and/or stored with the content item. For example, the confidence level may be indicated in all or a portion of the content segments for the recorded content item. For example, an indicator of the confidence level may be added to and stored in all or a portion of the content segments for the recorded content item. For example, the confidence level, or indication thereof, may be stored in the header, the metadata, or another portion of each content segment of the portion of the content segments for the recorded content item.

At 730, at least a portion of the recorded content item may be prepared for delivery or caused to be prepared for delivery to the user (e.g., to the computing device 110D associated with the user). For example, the portion of the content item may be prepared or caused to be prepared for delivery by the computing device 110B. For example, the at least the portion of the recorded content item may be prepared for delivery during the predicted time window or within a predetermined amount of time of (e.g., any amount of time between 1 second and 7 days before of the beginning of) the predicted time window for the recorded content item. For example the at least the portion of the recorded content item prepared for delivery may comprise all or any portion of the recorded content item and/or the manifest for the recorded content item. For example, the amount of the recorded content item prepared or caused to be prepared for delivery may be based on the confidence level. For example, as the confidence level that the computing device will receive a request from the user to watch the recorded content item and/or the confidence level that the likelihood that the predicted time window is correct increase, the amount of the recorded content item prepared for delivery or caused to be prepared for delivery may be increased. For example, the amount of the recorded content item prepared or caused to be prepared for delivery may be based on the time remaining before the predicted time window begins. For example, as the time remaining before the predicted time window begins is reduced, the amount of the recorded content item prepared or caused to be prepared for delivery may increase. For example, the portion of the content item may be prepared or caused to be prepared based on the current time or the amount of time that has lapsed since the recorded content item began being within the predicted time window or within a threshold amount of time before the beginning of the predicted time window.

For example, the manifest agent 119 or another portion of the computing device 110B may retrieve the predicted time window stored with or associated with the recorded content item and monitor the predicted time window for the recorded content item. For example, the predicted time window may be stored in the session index of the session module 113 and/or indicated in one or more of the recorded content segments for the recorded content item. The manifest agent 119 may determine, prior to a request to watch the recorded content item being received from the user, if a current time (i.e., the present time) is within the predicted time window for viewing the recorded content item or within a threshold amount of time before the beginning (e.g., the predicted earliest viewing time) of the predicted time window for viewing the recorded content item. For example, the manifest agent 119 may compare the current time (which may include a date or be represented by the amount of time that has elapsed since the recorded content item was recorded) to the predicted time window (which may include a date and time or may be represented by the amount of time after the recorded content item was recorded. The manifest agent 119 may determine that the current time is within the predicted time window for viewing the recorded content item or within a threshold amount of time before the beginning (e.g., the predicted earliest viewing time) of the predicted time window for viewing the recorded content item. Based on the current time being within the predicted time window for viewing the recorded content item or within a threshold amount of time before the beginning of the predicted time window for viewing the recorded content item, all or any portion of the recorded content item may be prepared for delivery or caused to be prepared for delivery.

For example, preparing at least the portion or causing at least the portion of the recorded content item to be prepared for delivery to the user may comprise determining and/or creating all or a portion of a manifest for the recorded content item. For example, one or more of the computing devices 110A-C may determine or create the manifest. For example, determining and/or creating the manifest may be based on the predicted time window for viewing the recorded content item. For example, the manifest agent 119 may determine if the recorded content item has been already viewed by the user or at the computing device 110D before the predicted time window for viewing the recorded content item has been reached. For example, the manifest agent 119 may determine if the recorded content item or the request to record the content item was previously deleted for the user/computing device 110D before the predicted time window was reached. For example, determining and/or creating the manifest may be based on the determination that the recorded content item has not been consumed (e.g., viewed, listened to) by the user and/or the recorded content item or the request to record the content item have not been deleted by the user (e.g., via the computing device 110D). For example, the amount of the manifest generated may be based on one or more of the confidence level that the timing window is correct or the confidence level for the likelihood the computing device will receive a request from the user (e.g., via the computing device 110D) to watch the recorded content item. For example, as the confidence level increases, the amount of the manifest created may increase for the recorded content item.

For example, the manifest for the recorded content item may be determined and/or created before the user and/or the computing device 110D associated with the initial request to record the content item sends a request to watch the recorded content item. The manifest for the recorded content item may be unique for each user requesting to record the content item. For example, the manifest may be stored in the computing device 110B. For example, the manifest may be stored in an intelligence cache 115 included in or associated with the computing device 110B.

The computing device 110D (e.g., a user device, such as a desktop computer, laptop computing, smart phone, tablet computer, smart watch, set-top box, etc.) may send a request to watch the recorded content item. For example, the user associated with the computing device 110D may send the request to watch the recorded content item via the computing device 110D. For example, the request to watch the recorded content item may occur within the predicted time window. The computing device 110B, having already generated and stored the manifest for the recorded content item in the intelligence cache 115 may send the manifest to the computing device 110D. The computing device 110D may evaluate the manifest for the recorded content item and send a request for the first segment for the recorded content item. For example, the request for the first segment of the recorded content item may be sent to the computing device 110C (e.g., the packager). The packager of the computing device 110C may send a request to the computing device 110A to receive the first segment of the recorded content item. The first segment of the recorded content item may be sent from the database 137 of the computing device 110A to the computing device 110C. The packager of the computing device 110C may package the first segment and send it to the computing device 110D to be output. As a result of generating the manifest for the recorded content item prior to receiving the request to watch the recorded content item, the amount of time from the request to watch the recorded content item to the first frame of the recorded content item being displayed at or caused to be displayed by the computing device 110D may be reduced.

For example, the computing device 110D may not send a request to watch the recorded content item or the request to watch the recorded content item may not be sent until a time after the predicted time window. For example, the computing device 110D may remove or delete manifests for recorded content items once the predicted time window has passed or a threshold amount of time after the end of the predicted time window. For example, the manifest agent 119 may be configured to determine if a predicted time window for a recorded content item has expired (e.g., the present time is later than the end of the predicted time window, the predicted latest viewing time) or the present time satisfies a threshold time past the predicted latest viewing time of the predicted time window for viewing the recorded content item. Based on a determination that the predicted time window has expired or the present time satisfies a threshold time past the predicted latest viewing time of the predicted time window, the manifest agent 119 may delete or cause the manifest for the recorded content item to be deleted from the intelligent cache 115. In this example, should a request to watch the recorded content item be subsequently received or indicated, the manifest for the recorded content item may be generated and sent to the computing device 110D after receiving the request to watch the recorded content item.

For example, causing at least a portion of the recorded content item to be prepared for delivery may comprise reconstituting all or a portion of the recorded content item from an archived copy of the recorded content item. For example, a threshold time period for archiving a recorded content item for a particular user or computing device 110D may be less than a determined predicted time window, or at least less than the predicted latest viewing time of the predicted time window for viewing the recorded content item. This may result in the recorded content item being archived before the predicted time window and before user watches the recorded content item.

For example, a determination of whether to reconstitute the archived content item, before a request to watch the recorded content item is received from a user or user device 110D and within the predicted time window or within a predetermined amount of time before the beginning of the predicted time window, may be made based on a confidence level that the predicted time window is correct. For example, the confidence level may be determined by the computing device 110B. For example, the confidence level may be determined based on the content item identified in the indication. For example, the confidence level may be determined based on the content type or genre of the content item. For example, the confidence level may be determined based on the predicted time window and the content type or genre for the recorded content item. For example, the confidence level may comprise a percentage, value, or score indicating a level of certainty or percentage of amount of times that the predicted time window is correct for the recorded content item.

For example, the manifest agent 119 may query the machine-learning module to obtain the confidence level based on the content type for the recorded content item. For example, the manifest agent 119 may determine that the confidence level satisfies a confidence threshold by comparing the confidence level to the confidence threshold. For example, based on the confidence level satisfying the confidence threshold (e.g., greater than or greater than or equal to the confidence threshold), at least a portion of the archived content item may be reconstituted as a portion of the recorded content item. For example, the portion of the recorded content item may comprise all or less than all of the recorded content item. For example, the amount of the archived content item reconstituted into the recorded content item may be based on the confidence level that the predicted time window will be correct and/or the confidence level for the likelihood the computing device will receive a request from the user (via the computing device 110D) to watch the recorded content item. For example, as the confidence level increases, the amount of the archived content item that is reconstituted into the recorded content item will increase. For example, a confidence level of 50 percent may cause 25 percent of the archived content item to be reconstituted into the recorded content item; a confidence level of 60 percent may cause 50 percent of the archived content item to be reconstituted into the recorded content item; a confidence level over 65 percent may cause the entire archived content item to be reconstituted into the entire recorded content item. The percentages provided herein are for example purposes only as other combinations of percentages may replace the combinations presented herein based on accuracy of the trained model, the amount of storage available, and the desires of the system designers. For example, the archive agent 141 may manage the reconstituting of the recorded content item from the archived content item.

For example, determining an amount of a manifest to determine or create may be based on the confidence level (e.g., one or more of the confidence level the predicted time window is correct or the confidence level for the likelihood the computing device will receive a request from the user (via the computing device 110D) to watch the recorded content. For example, the higher the confidence level, the greater the amount of the portion of manifest for the recorded content item that is determined. For example, a confidence level of 50 percent may cause 25 percent of the manifest to be determined; a confidence level of 60 percent may cause 50 percent of the manifest to be determined; a confidence level over 65 percent may cause the entire manifest to be determined. The percentages provided herein are for example purposes only as other combinations of percentages may replace the combinations presented herein based on accuracy of the trained model, the amount of storage available, and the desires of the system designers.

Figure 8:
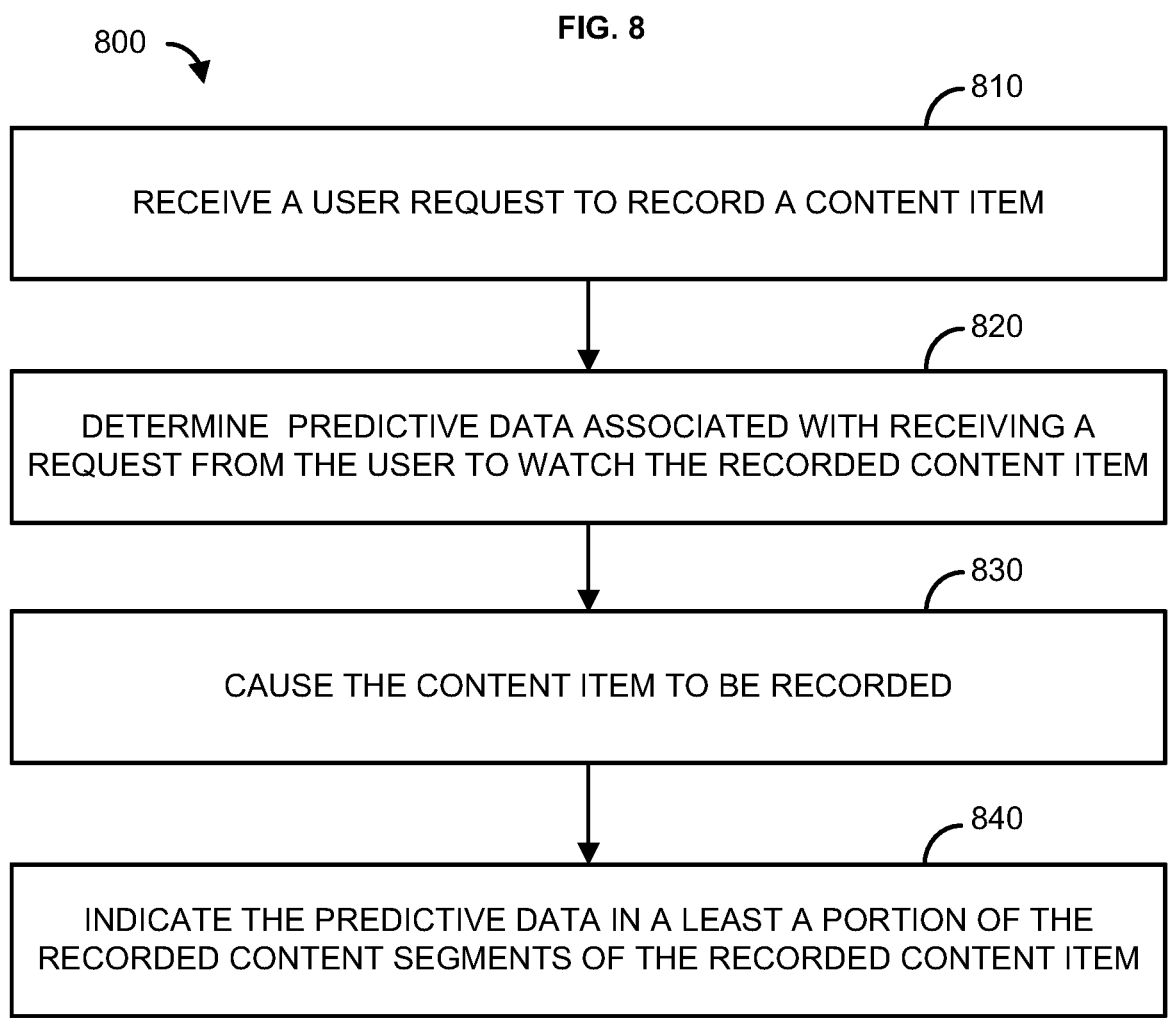
FIG. 8 shows a flowchart for an example method.

FIG. 8 shows a flowchart of an example method 800 for improving playback of recorded content items. The methods described in FIG. 8 may be completed by a computing device, such as the computing device 110B or any other computing device described herein. While the method 800 of FIG. 8 will be described as being completed by the computing device 110B this is for example purposes only.

A user, via, for example, the computing device 110D associated with the user, may send a request to record a content item (e.g., a sporting event, episode of a television show, movie, concert, news program, a special event, etc.). For example, the user may send, via the computing device 110D, the request to one or more of the computing devices 110A-C. The request may comprise an identifier (e.g., name, content ID, etc.) for the content item, a time the content item will be airing (e.g., when to begin recording), a device ID (e.g., a device number, MAC address, phone number, URL, etc.) that uniquely identifies the computing device 110D, and/or a user ID (e.g., a user name, phone number, customer number, address, etc.) that identifies the user making the request.

At 810, the computing device 110A-C may receive the request to record the content item and may determine when to begin recording the content item. The request to record the content item may be received from the user via the computing device 110D and the network 104. For example, the recording agent 105 may evaluate the request and determine when to begin recording the content item. When the time to begin recording is reached, the recording agent 105 may further facilitate the recording of the content item and storage of the recorded content item in the database 137.

The computing device 110B may receive an indication of the request to record the content item for subsequent viewing by the user. For example, the indication may be received by one or more of the session module 113 and/or the machine-learning module 117. For example, the session module 113 may receive the request or an indication of the request and store information about the request in the session index. The information to be stored in the session index may include the content identifier, the time the request to record the content item was made, the time the content item will be airing, the content type or genre for the content item, the content rating for the content item, the duration of the content item, and/or the number of times the content item has been scheduled to air. Portions of the content information may not be in the request but may be determined based on metadata for the content item. The session module 113 may also store the user information in the session index in association with the recorded content item and/or the request to record the content item.

At 820, predictive data associated with receiving the request from the user to watch the recorded content item may be determined. For example, the predictive data may be determined by the machine-learning module 117. For example, the predictive data may comprises a predicted time window for receiving a request to watch the recorded content item or a confidence level associated with the request to record the content item. The confidence level may indicate the likelihood the computing device will receive a request from the user to watch the recorded content item or the likelihood that the predicted time window is correct.

The machine-learning module 117 may determine the predicted time window based on a trained model. The trained model may be determined by the machine-learning module 117 based on historical playback data for a plurality of recorded content items. For example, the historical playback data may be received by the session module 113 and stored in the session index of the session module 113. The historical playback data may be received based on a plurality of computing devices 110D requesting to record a plurality of content items over a period of time. For example, the historical playback data may be for recorded content items requested to be recorded by the user and/or a plurality of other users. For example, the plurality of other users may share one or more traits with the user that requested to record the content item, such as gender, location (e.g., the same region of an area), within a same age range. The computing device 110B, such as the machine-learning module 117, may use machine-learning and the historical playback data to determine the trained model for predicting time windows of when the user is likely to request to watch the recorded content items. For example, the historical playback data may comprise a content ID for each of the plurality of recorded content items, a content type for each of the plurality of recorded content items, a content rating for the each of the plurality of content items, a duration for each of the plurality of content items, a number of times each of the plurality of content items has been scheduled to air, a scheduled airing time for each of the plurality of content items, an amount of time between the time each of the plurality of content times began to be recorded and the time a request to watch the corresponding recorded content item was received (e.g., the stored timespan), and user data associated with each of the users associated with the request to record each of the plurality of recorded content items. The user data may include one or more of a user name, user ID, location of the user, computing device ID, user gender, user age, prior requests to record content items from the user, the amount of time the user took to request to watch other recorded content items, etc. The predicted time window may be determined based on whether the recorded content item was live, real time, or time shifted content. For example, the trained model may be determined based on the historical playback data and a random forest algorithm.

For example, the predicted time window may be determined based on the content item identified in the indication. For example, the predicted time window may be determined based on one or more of the content type or genre (e.g., a movie, a sporting event, a concert, a news program, a sit-com program, a drama program, a children's program, a cartoon program, etc.) for the content item, the duration of the content item, a scheduled airing time for the content item, a content rating for the content item, a number of times the content item has been scheduled to air, and/or user data associated with the user requesting to record the content item. The user data may include one or more of user name, user ID, location of the user, computing device 110D ID, user gender, user age, prior requests to record content items for the user, the amount of time the user took to request to watch other recorded content items, etc.

The machine-learning module 117 may determine the confidence level for the request to record the content item. The confidence level may be determined based on the trained model. The confidence level may indicate the likelihood the computing device will receive a request from the user to watch the recorded content item or the likelihood that the predicted time window is correct. For example, the confidence level may be determined based on the content item identified in the request to record the content item. For example, the confidence level may be determined based on the content type or genre of the content item. For example, the confidence level may be determined based on the predicted time window and the content type or genre for the recorded content item. For example, the confidence level may comprise a percentage, value, or score indicating a level of certainty or percentage of amount of times that the predicted time window is correct for the recorded content item and/or the likelihood the computing device will receive a request from the user to watch the recorded content item. For example, the machine-learning module 117 may determine for each content type a confidence level that the predicted time window will be correct and/or a confidence level of the likelihood the computing device will receive the request from the user to watch the recorded content item.

At 830, the requested content item may be recorded. For example, one or more of the computing devices 110A-C may record or cause the requested content item to be recorded. For example, the computing device 110B may cause another computing device to record the requested content item. For example, the requested content item may comprise a plurality of content segments that are recorded. The plurality of recorded content segments for the recorded content item may be stored. For example, the plurality of the recorded content segments may be stored in a database or other storage device.

At 840, the predictive data may be indicated in at least a portion of the plurality of recorded content segments for the recorded content item. For example, the predictive data may be indicated in all or a portion of the recorded content segments for the recorded content item. For example, one or more indicator of the predictive data may be added to and stored in all or a portion of the recorded content segments for the recorded content item. For example, the predictive data, or an indication thereof, may be stored in the header, the metadata, or another portion of each recorded content segment of the portion of the recorded content segments for the recorded content item.

For example, the predictive data may be stored in the session index of the session module 113 and associated with the data for the recorded content item. For example, the data for the recorded content item may comprise the information in the request to record the content item. For example, the session index of the session module 113 may comprise a queue. For example, the queue may organize a plurality of requests to record content items temporally based on the predicted time window for each particular recorded content item. For example, the queue may organize the plurality of requests to record content items temporally based on the predicted earliest viewing time of the predicted time window for each particular recorded content item.

All or at least a portion of the recorded content item may be prepared for delivery or caused to be prepared for delivery to the user (e.g., the computing device 110D associated with the user). For example, the portion of the content item may be prepared or caused to be prepared for delivery by the computing device 110B. For example, the portion of the content item may be prepared or caused to be prepared for delivery based on one or more of the predicted time window, the confidence level the predictive time window is correct, or the confidence level of the likelihood the computing device will receive the request from the user to watch the recorded content item. For example, the portion of the content item may be prepared or caused to be prepared based on the current time or the amount of time that has lapsed since the recording of the content item began being within the predicted time window or within a threshold amount of time before the beginning of the predicted time window.

For example, the at least the portion of the recorded content item may be prepared for delivery during the predicted time window or within a predetermined amount of time of (e.g., any amount of time between 1 second and 7 days before of the beginning of) the predicted time window for the recorded content item. For example, the at least the portion of the recorded content item prepared for delivery may comprise all or any portion of the recorded content item and/or the manifest for the recorded content item. For example, the amount of the recorded content item prepared or caused to be prepared for delivery may be based on the confidence level. For example, as the confidence level that the computing device will receive a request from the user to watch the recorded content item and/or the confidence level that the likelihood that the predicted time window is correct increase, the amount of the recorded content item prepared for delivery or caused to be prepared for delivery may be increased. For example, the amount of the recorded content item prepared or caused to be prepared for delivery may be based on the time remaining before the predicted time window begins. For example, as the time remaining before the predicted time window begins is reduced, the amount of the recorded content item prepared or caused to be prepared for delivery may increase.

Causing all or at least a portion of the recorded content item to be prepared for delivery may comprise one or more of determining and/or creating a manifest for all or at least the portion of the recorded content item or reconstituting all or at least the portion of an archived version of the recorded content item. For example, the manifest agent 119 may determine if the recorded content item has been already viewed by the user or at the computing device 110D before the predicted time window for viewing the recorded content item has been reached. For example, the manifest agent 119 may determine if the recorded content item or the request to record the content item was previously deleted for the user/computing device 110D before the predicted time window was reached.

For example, one or more of the computing devices 110A-C may determine or create the manifest. For example, determining and/or creating the manifest may be based on the determination that the recorded content item has not been consumed (e.g., viewed, listened to) by the user and/or the recorded content item or the request to record the content item have not been deleted by the user (e.g., via the computing device 110D) (e.g., prior to or during the predicted time window). For example, determining or creating a manifest for at least the portion of the recorded content item may comprise determining or creating a manifest for the entirety of the recorded content item. For example, the amount of the manifest determined or created for the recorded content item may be based on the confidence level. For example, the higher the confidence level, the greater the amount of the portion of manifest for the recorded content item that is determined and/or created. For example, a confidence level of 50 percent may cause 25 percent of the manifest to be determined and/or created; a confidence level of 60 percent may cause 50 percent of the manifest to be determined and/or created; a confidence level over 65 percent may cause the entire manifest to be determined and/or created. The percentages provided herein are for example purposes only as other combinations of percentages may replace the combinations presented herein based on accuracy of the trained model, the amount of storage available, and the desires of the system designers.

For example, determining and/or creating the manifest may be further based on the predicted time window for viewing the recorded content item. The manifest agent 119 or another portion of the computing device 110B may monitor the predicted time window for viewing the recorded content item, for which information was stored in one or more segments of the recorded content item and/or the session index of the session module 113, to determine, prior to a request to watch the recorded content item being received from the user, if a current time (i.e., the present time) is within the predicted time window for viewing the recorded content item or within a threshold amount of time before the beginning (e.g., the predicted earliest viewing time) of the predicted time window for viewing the recorded content item. For example, the manifest agent 119 may compare the current time (which may include a date or be represented by the amount of time that has elapsed since the recorded content item was recorded) to the predicted time window (which may include a date and time or may be represented by the amount of time after the recorded content item was recorded. The manifest agent 119 may determine that the current time is within the predicted time window for viewing the recorded content item or within a threshold amount of time before the beginning (e.g., the predicted earliest viewing time) of the predicted time window for viewing the recorded content item. Based on the current time being within the predicted time window for viewing the recorded content item or within a threshold amount of time before the beginning of the predicted time window for viewing the recorded content item, the manifest for the recorded content item may be determined. For example, determining the manifest, or the portion of the manifest may comprise creating or causing the creation of the manifest (or portion of the manifest).

For example, the manifest for the recorded content item may be determined and/or created before the user and/or the computing device 110D associated with the initial request to record the content item sends a request to watch the recorded content item. The manifest for the recorded content item may be unique for each user requesting to record the content item. The manifest (e.g., the manifest 160) may be stored in the computing device 110B. For example, the manifest may be stored in an intelligence cache 115 included in or associated with the computing device 110B.

The computing device 110D (e.g., a user device, such as a desktop computer, laptop computing, smart phone, tablet computer, smart watch, set-top box, etc.) may send a request to watch the recorded content item. For example, the user associated with the computing device 110D may send the request to watch the recorded content item. For example, the request to watch the recorded content item may occur within the predicted time window. The computing device 110B, having already generated and stored the manifest for the recorded content item in the intelligence cache 115 may send the manifest to the computing device 110D. The computing device 110D may evaluate the manifest for the recorded content item and send a request the first segment for the recorded content item. For example, the request for the first segment of the recorded content item may be sent to the computing device 110C (e.g., the packager). The packager of the computing device 110C may send a request to the computing device 110A to receive the first segment of the recorded content item. The first segment of the recorded content item may be sent from the database 137 of the computing device 110A to the computing device 110C. The packager of the computing device 110C may package the first segment and send it to the computing device 110D to be output. As a result of generating the manifest for the recorded content item prior to receiving the request to watch the recorded content item, the amount of time from the request to watch the recorded content item to the first frame of the recorded content item being displayed at or caused to be displayed by the computing device 110D may be reduced.

For example, the computing device 110D may not send a request to watch the recorded content item or the request to watch the recorded content item may not be sent until a time after the predicted time window. For example, the computing device 110D may remove or delete manifests for recorded content items once the predicted time window has passed or a threshold amount of time after the end of the predicted time window. For example, the manifest agent 119 may be configured to determine if a predicted time window for a recorded content item has expired (e.g., the present time is later than the end of the predicted time window, the predicted latest viewing time) or the present time satisfies a threshold time past the predicted latest viewing time of the predicted time window for viewing the recorded content item. Based on a determination that the predicted time window has expired or the present time satisfies a threshold time past the predicted latest viewing time of the predicted time window, the manifest agent 119 may delete or cause the manifest for the recorded content item to be deleted from the intelligent cache 115. In this example, should a request to watch the recorded content item be subsequently received or indicated, the manifest for the recorded content item may be generated and sent to the computing device 110D after receiving the request to watch the recorded content item.

Reconstituting all or a portion of the recorded content item from an archived copy of the recorded content item may be based on the confidence level for the predicted time window for viewing the recorded content item. For example, a threshold time period for archiving a recorded content item for a particular user or computing device 110D may be less than a determined predicted time window, or at least less than the predicted latest viewing time of the predicted time window for viewing the recorded content item. This may result in the recorded content item being archived before the user watches the recorded content item.

For example, a determination of whether to reconstitute the archived content item, before a request to watch the recorded content item is received from a user or user device 110D and within the predicted time window or within a predetermined amount of time before the beginning of the predicted time window, may be made based on a confidence level that the predicted time window is correct. For example, the confidence level may be determined by the computing device 110B. For example, the confidence level may be determined based on the content item identified in the indication. For example, the confidence level may be determined based on the content type or genre of the content item. For example, the confidence level may be determined based on the predicted time window and the content type or genre for the recorded content item. For example, the confidence level may comprise a percentage, value, or score indicating a level of certainty or percentage of amount of times that the predicted time window is correct for the recorded content item.

For example, the manifest agent 119 may query the machine-learning module to obtain the confidence level based on the content type for the recorded content item. For example, the manifest agent 119 may determine that the confidence level satisfies a confidence threshold by comparing the confidence level to the confidence threshold. For example, based on the confidence level satisfying the confidence threshold (e.g., greater than or greater than or equal to the confidence threshold), at least a portion of the archived content item may be reconstituted as a portion of the recorded content item. For example, the portion of the recorded content item may comprise all or less than all of the recorded content item. For example, the amount of the archived content item reconstituted into the recorded content item may be based on the confidence level that the predicted time window will be correct and/or the confidence level for the likelihood the computing device will receive a request from the user (via the computing device 110D) to watch the recorded content item. For example, as the confidence level increases, the amount of the archived content item that is reconstituted into the recorded content item will increase. For example, a confidence level of 50 percent may cause 25 percent of the archived content item to be reconstituted into the recorded content item; a confidence level of 60 percent may cause 50 percent of the archived content item to be reconstituted into the recorded content item; a confidence level over 65 percent may cause the entire archived content item to be reconstituted into the entire recorded content item. The percentages provided herein are for example purposes only as other combinations of percentages may replace the combinations presented herein based on accuracy of the trained model, the amount of storage available, and the desires of the system designers. For example, the archive agent 141 may manage the reconstituting of the recorded content item from the archived content item.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
receiving, by a computing device, a request from a user device, associated with a user, to record a content item;
determining, based on the content item, a predicted time window for receiving a request from the user device to watch the recorded content item;
determining, based on the content item, a confidence level for the predicted time window; and
causing, based on the confidence level, at least a portion of the recorded content item to be prepared for delivery to the user device.

2. The method of claim 1, further comprising:
causing the content item to be recorded, wherein the content item comprises a plurality of content segments; and
indicating at least one of the predicted time window or the confidence level in at least a portion of the plurality of content segments of the recorded content item.

3. The method of claim 1, wherein causing the at least the portion of the recorded content item to be prepared for delivery comprises creating a manifest file for the at least the portion of the recorded content item.

4. The method of claim 1, wherein determining, based on the content item, the predicted time window comprises determining, based on a content type for the content item, the predicted time window for receiving the request from the user device to watch the recorded content item.

5. The method of claim 4, wherein determining the predicted time window is further based on one or more of a duration of the content item, a scheduled airing time for the content item, a content rating for the content item, a number of times the content item has been scheduled to air; or user data associated with the user.

6. The method of claim 1, further comprising determining, based on the confidence level for the predicted time window an amount of the at least the portion of the recorded content item to cause to be prepared for delivery.

7. The method of claim 1, wherein determining the predicted time window for receiving the request from the user device to watch the recorded content item comprises determining, by a trained model and based on the content item, the predicted time window for receiving the request from the user device to watch the recorded content item.

8. The method of claim 1, further comprising:
receiving historical playback data for a plurality of recorded content items,
wherein determining the predicted time window is further based on the historical playback data for the plurality of recorded content items.

9. A method comprising:
receiving a user request to record a content item;
determining, by a trained model and based on historical content item playback data associated with a user, a predicted time window for receiving a request from the user to watch the recorded content item; and
causing, based on the predicted time window, at least a portion of the recorded content item to be prepared for delivery to a user device associated with the user.

10. The method of claim 9, further comprising:
causing the content item to be recorded, wherein the content item comprises a plurality of content segments; and
indicating the predicted time window in at least a portion of the plurality of content segments of the recorded content item.

11. The method of claim 9, wherein causing the at least the portion of the recorded content item to be prepared for delivery comprises determining a manifest for the at least the portion of the recorded content item.

12. The method of claim 9, further comprising:
determining a current time is within the predicted time window,
wherein causing the at least the portion of the recorded content item to be prepared for delivery comprises, based on the current time being within the predicted time window, causing the at least the portion of the recorded content item to be prepared for delivery.

13. The method of claim 9, wherein determining the predicted time window for receiving the request from the user device to watch the recorded content item comprises determining, by the trained model and based on the content item and the historical playback data, the predicted time window for receiving the request from the user device to watch the recorded content item.

14. The method of claim 9, further comprising:
determining, based on the content item, a confidence level for the predicted time window,
wherein causing the at least the portion of the recorded content item to be prepared for delivery to the user device is further based on the confidence level.

15. The method of claim 9, wherein determining, based on the content item, the predicted time window, comprises determining the predicted time window based on one or more of a content type for the content item, a duration of the content item, a scheduled airing time for the content item, a content rating for the content item, a number of times the content item has been scheduled to air, or user data associated with the user.

16. A method comprising:
receiving, by a computing device, a request from a user device, associated with a user, to record a content item;

determining, based on the content item, predictive data associated with receiving a request from the user device to watch the recorded content item;

causing the content item to be recorded, wherein the content item comprises a plurality of content segments; and indicating the predictive data in at least a portion of the plurality of content segments of the recorded content item.

17. The method of claim 16, further comprising adding the predictive data to the at least the portion of the plurality of content segments of the recorded content item.

18. The method of claim 16, wherein the predictive data comprises at least one of a predicted time window for receiving the request from the user device to watch the recorded content item or a confidence level for receiving the request from the user device to watch the recorded content item.

19. The method of claim 16, further comprising causing, based on the predictive data, at least a portion of the recorded content item to be prepared for delivery to the user device.

20. The method of claim 16, wherein the predictive data is indicated in one of a header or metadata for the at least the portion of the plurality of content segments.

* * * * *